(12) United States Patent
Mikami et al.

(10) Patent No.: US 9,394,500 B2
(45) Date of Patent: Jul. 19, 2016

(54) GREASE COMPOSITION, GREASE-ENCLOSED BEARING, AND ONE-WAY CLUTCH

(75) Inventors: Hidenobu Mikami, Kuwana (JP); Takayuki Kawamura, Kuwana (JP)

(73) Assignee: NTN CORPORATION, Osaka (JP)

( * ) Notice: Subject to any disclaimer, the term of this patent is extended or adjusted under 35 U.S.C. 154(b) by 664 days.

(21) Appl. No.: 12/162,498

(22) PCT Filed: Feb. 15, 2007

(86) PCT No.: PCT/JP2007/052721
§ 371 (c)(1),
(2), (4) Date: Jul. 29, 2008

(87) PCT Pub. No.: WO2007/094405
PCT Pub. Date: Aug. 23, 2007

(65) Prior Publication Data
US 2009/0005272 A1    Jan. 1, 2009

(30) Foreign Application Priority Data

| Feb. 16, 2006 | (JP) | ................................ | 2006-038706 |
| Mar. 22, 2006 | (JP) | ................................ | 2006-078387 |
| Apr. 13, 2006 | (JP) | ................................ | 2006-111145 |
| May 15, 2006  | (JP) | ................................ | 2006-135036 |
| May 15, 2006  | (JP) | ................................ | 2006-135055 |
| Jun. 29, 2006 | (JP) | ................................ | 2006-179797 |

(51) Int. Cl.
*C10M 169/00* (2006.01)
*C10M 125/04* (2006.01)
(Continued)

(52) U.S. Cl.
CPC ........... *C10M 125/04* (2013.01); *C10M 119/24* (2013.01); *C10M 169/00* (2013.01);
(Continued)

(58) Field of Classification Search
CPC ............. C10M 125/04; C10M 125/10; C10M 125/20; C10M 125/22; C10M 119/24; C10M 125/00; C10M 169/00; C10M 2201/06; C10M 2217/0456; C10M 2290/00; C10N 2250/10
USPC .......................................... 508/165, 172, 150
See application file for complete search history.

(56) References Cited

U.S. PATENT DOCUMENTS

| 4,239,632 A | 12/1980 | Baile |
| 4,308,182 A * | 12/1981 | Eckard et al. ................. 524/270 |

(Continued)

FOREIGN PATENT DOCUMENTS

| CN | 1578825 | 2/2005 |
| EP | 1496103 A2 | 1/2005 |

(Continued)

OTHER PUBLICATIONS

Chinese Office Action for corresponding CN Application No. 200780005811.9, Nov. 23, 2011.

(Continued)

*Primary Examiner* — Taiwo Oladapo
(74) *Attorney, Agent, or Firm* — Ditthavong & Steiner, P.C.

(57) ABSTRACT

The present invention provides a grease composition capable of effectively preventing a rolling surface from having hydrogen brittleness-caused peeling, a grease-enclosed bearing in which the grease composition is enclosed, and a one-way clutch in which the grease composition is enclosed at a sliding portion. The grease composition contains a base grease consisting of a base oil and a thickener and an additive added to the base grease. The grease composition is capable of preventing hydrogen brittleness-caused peeling from occurring on a frictionally worn surface of a bearing portion containing an iron-based metal material or a newly generated surface consisting of the iron-based metal material exposed owing to wear. The additive contains at least one aluminum-based additive selected from among an aluminum powder and inorganic aluminum compounds. The mixing ratio of the aluminum-based additive to 100 parts by weight of the base grease is set to 0.05 to 10 parts by weight.

9 Claims, 10 Drawing Sheets

(51) Int. Cl.
*C10M 119/24* (2006.01)
*F16C 33/66* (2006.01)
*C10M 125/22* (2006.01)
*C10M 125/00* (2006.01)

(52) U.S. Cl.
CPC ......... *F16C33/6607* (2013.01); *F16C 33/6633* (2013.01); *C10M 125/00* (2013.01); *C10M 125/22* (2013.01); *C10M 2201/04* (2013.01); *C10M 2201/06* (2013.01); *C10M 2201/062* (2013.01); *C10M 2205/0213* (2013.01); *C10M 2207/026* (2013.01); *C10M 2207/0406* (2013.01); *C10M 2209/102* (2013.01); *C10M 2209/109* (2013.01); *C10M 2215/1026* (2013.01); *C10M 2217/0456* (2013.01); *C10M 2290/00* (2013.01); *C10N 2210/03* (2013.01); *C10N 2240/02* (2013.01); *C10N 2250/10* (2013.01)

(56) References Cited

U.S. PATENT DOCUMENTS

| | | | |
|---|---|---|---|
| 5,102,565 A * | 4/1992 | Waynick | C10M 169/00 508/164 |
| 5,840,666 A | 11/1998 | Yokouchi et al. | |
| 5,955,402 A * | 9/1999 | Hirata et al. | 508/106 |
| 6,329,327 B1 * | 12/2001 | Tanaka et al. | 508/362 |
| 2002/0098989 A1* | 7/2002 | Heimann et al. | 508/136 |
| 2003/0119681 A1* | 6/2003 | Patel et al. | 508/150 |
| 2005/0009713 A1 | 1/2005 | Kohara et al. | |

FOREIGN PATENT DOCUMENTS

| | | |
|---|---|---|
| JP | 50-134006 A | 10/1975 |
| JP | 03-210394 A | 9/1991 |
| JP | 09-169989 A | 6/1997 |
| JP | 09-217752 A | 8/1997 |
| JP | 11-82688 A | 3/1999 |
| JP | 2000-234638 A | 8/2000 |
| JP | 2000-253620 A | 9/2000 |
| JP | 2002-302972 A | 10/2002 |
| JP | 2003-42166 A | 2/2003 |
| JP | 2003-105366 A | 4/2003 |
| JP | 2004-2696 A | 1/2004 |
| JP | 2004-59814 A | 2/2004 |
| JP | 2004-143263 | 5/2004 |
| JP | 2004-270887 A | 9/2004 |
| JP | 2005-29622 A | 2/2005 |
| JP | 2005-42102 A | 2/2005 |
| JP | 2005-112901 A | 4/2005 |
| JP | 2005-112902 A | 4/2005 |
| JP | 2005-308163 A | 11/2005 |
| JP | 2005-314459 A | 11/2005 |
| JP | 2005-325858 A | 11/2005 |
| JP | 2006-124426 A | 5/2006 |
| JP | 2006-300211 A | 11/2006 |
| JP | 2007-23105 A | 2/2007 |
| JP | 2007-31614 A | 2/2007 |
| JP | 2007-32104 A | 2/2007 |
| JP | 2007-39572 A | 2/2007 |
| JP | 2007-40446 A | 2/2007 |
| JP | 2007-45994 A | 2/2007 |
| JP | 2007-46753 A | 2/2007 |
| WO | WO 03/038016 | 5/2003 |
| WO | WO 2006/001309 A1 | 1/2006 |
| WO | WO 2006/112502 A1 | 10/2006 |

OTHER PUBLICATIONS

Office Action for corresponding German Application No. 11 2007 000 335.9, dated Oct. 29, 2014, 9 pages.

* cited by examiner (a)

(b)

GREASE COMPOSITION, GREASE-ENCLOSED BEARING, AND ONE-WAY CLUTCH

TECHNICAL FIELD

The present invention relates to a grease composition capable of effectively preventing a rolling surface from having hydrogen brittleness-caused peeling and a grease-enclosed bearing in which the grease composition is enclosed.

More particularly the present invention relates to a grease-enclosed bearing such as rolling bearings for use in electric auxiliary machines of a car such as a fan-coupling apparatus, an alternator, an idler pulley, an electromagnetic clutch for an air conditioner, an electromotive fan motor, and the like; grease-enclosed bearings for motors for use in industrial machines and electric equipment; rolling bearings, for use in a fuel cell system, which are used for a compressed fluid-feeding machine or the like for delivering various kinds of fluids inside the fuel cell system under pressure; rolling bearings, for use in robots, which are used in operating portions of industrial robots.

The present invention also relates to a one-way clutch in which the grease composition is enclosed at an internal space.

BACKGROUND ART

Owing to a recent growing demand for development of small vehicles, lightweight vehicles, and the improvement of silence, attempts are being made to manufacture smaller and more lightweight electric auxiliary machine of vehicles, and to make the engine room airtight. On the other hand, there is a growing demand for a high output and a high efficiency for the performance of various apparatuses of the vehicle. Thus the present tendency is to compensate the miniaturization-caused reduction of the output of the electric auxiliary machine of the vehicle provided inside the engine room by rotating them at high speeds.

As examples of rolling bearings for use in the electric auxiliary of the vehicle, a rolling bearing for use in the fan coupling apparatus, a rolling bearing for use in the alternator, a rolling bearing for use in the idler pulley are outline below.

Regarding the fan coupling apparatus, a viscous fluid is sealed inside it. A housing having an air-feeding fan mounted on its peripheral surface is coupled to a rotor directly connected to the engine through a bearing. By utilizing the shear resistance of the viscous fluid which increases and decreases in response to an atmospheric temperature, the fan-coupling apparatus controls the amount of a driving torque transmitted from the engine and the number of rotations of the fan, thereby feeding optimum air corresponding to the temperature of the engine. Therefore the rolling bearing for use in the fan-coupling apparatus is demanded to have a high heat resistance, grease-sealing performance, and durability so that the rolling bearing withstands a high rotational speed change in the range from 1000 rpm to 10000 rpm in dependence on a fluctuation of the temperature of the engine and in addition withstands very strict environment in which it is driven in summer at a high speed not less than 10000 rpm at a high temperature not less than 150° C.

The alternator for use in a car receives the rotation of an engine and generates electricity, thus supplying an electric power to an electric load of the car and has a function of charging a battery. Therefore the rolling bearing for use in the alternator is demanded to have a high heat resistance, grease-sealing performance, and durability so that the rolling bearing withstands a very strict environment in which it is rotated at a high speed not less than 10000 rpm at a high temperature not less than 150° C.

The idler pulley of a car is used as a belt tensioning part for the driving belt transmitting the engine power to the electric auxiliary machine thereof. The idler pulley has the function of a pulley for imparting a tensile force to the driving belt when the distance between rotating shafts is fixed. The idler pulley has another function of an idler used to change the travel direction of the belt or preventing interference with obstacles to thereby reduce the volume of the engine chamber.

Therefore the rolling bearing for use in the idle pulley is demanded to have a high heat resistance, grease-sealing performance, and durability so that the rolling bearing withstands a very strict environment in which it is rotated at a high speed not less than 10000 rpm at a high temperature not less than 150° C.

As a grease composition preferable for the rolling bearing such as the rolling bearing for use in the electric auxiliary machine of a car which is used at high temperature and rotational speed, a grease composition is known. The grease composition contains 0.5 to 10 wt % of amide-based wax having the property of preventing the base oil from being oxidized and having a melting point not less than 80° C. The base oil has a kinematic viscosity of 20 to 150 mm$^2$/second at 40° C. The grease composition contains the urea-based thickener at 5 to 30 wt % for the entire grease composition (see patent document 1).

In recent years, there is a tendency for small motors to be manufactured in industrial machines and for a bearing to be operated at a high surface pressure. In a servo motor, an acceleration and a deceleration to be applied thereto become high in drive—stop. As a result, the bearing has a large amount of slide. At a high temperature, the operation of high-speed drive—sudden deceleration drive—sudden acceleration drive—sudden stop is frequently repeated.

In a manufacturing line of a car, various kinds of industrial robots are used for assembling, welding, painting operations. To decrease a tact time for the improvement of productivity, there is a tendency for the motion speed of the robot to be increased. The operation of the robot is not successive, but intermittent. An increase in the operation speed of the robot causes the rolling bearing for use in a rotational portion to have an increase in the number of switching times of stop—start—operation—stopping operation per time. Each time switching is performed, an acceleration and a deceleration to be applied to the rolling bearing become high. Thereby the rolling bearing generates a large amount of slide.

In recent years, because the use condition for the rolling bearing for use in the electric auxiliary machine of a car, the bearing for use in a motor of an industrial machine, and the bearing for use in a robot has become strict, as described above, a peculiar peeling phenomenon occurs with the rolling surface of the bearing turning into white in its texture.

Unlike peeling which occurs in the inside of the rolling surface owing to metal fatigue, the peculiar peeling phenomenon occurs in the rolling surface at a comparatively shallow portion thereof with the rolling surface turning into white in its texture. That is, the peeling phenomenon is a hydrogen brittleness-caused destruction phenomenon.

As a method of preventing the peculiar peeling phenomenon which occurs in an early stage with the rolling surface turning into white in its texture, a method of adding a passivating agent to a grease composition (see patent document 2) and a method of adding bismuth dithiocarbamate thereto are known (see patent document 3).

In recent years, because the rolling bearing for use in the electric auxiliary machine of a car is used in a strict condition, neither the method of adding the passivating agent to the grease composition nor the method of adding bismuth dithiocarbamate thereto is sufficiently capable of solving the problem of the peeling phenomenon.

A fuel cell system attracts public attention as a new power source of a car or as a dispersion type generating apparatus. A fuel cell has a high output density and is operated at a low temperature. Further a material constructing the cell deteriorates to a low extent. A solid high molecular electrolyte type fuel cell which is actuated easily is effective as a power source of the car or the like.

In the fuel cell system, it is necessary to feed hydrogen and hydrogen rich modified gas serving as fuel and air serving as an oxidizing agent under pressure. To this end, various types of compressed fluid-feeding machines such as a supercharger, an impeller-type compressed fluid-feeding machine, a scroll-type compressed fluid-feeding machine, an iron plate-type compressed fluid-feeding machine, and a screw-type compressed fluid-feeding machine are used.

In the solid high molecular electrolyte type fuel cell, because for power generation, hydrogen serving as fuel and air serving as an oxidizing agent react with each other in a chemical reaction to generate water. In addition, a high molecular film is humidified by a humidifier to function the high molecular film as a solid electrolyte. Thus the solid high molecular electrolyte type fuel cell is constantly kept in a water-containing state. Therefore water is contained in a gas fed under pressure by the compressed fluid-feeding machine. When the water penetrates into the bearing of the compressed fluid-feeding machine, metal contact occurs due to defective lubrication. Therefore as in the case of the rolling bearing for use in the electric auxiliary machine of the car, there is a case in which the hydrogen brittleness-caused peeling phenomenon occurs with the rolling surface of the bearing turning into white in its texture.

Because the use condition for the rolling bearing for use in the fuel cell system has also become strict, the method of adding the passivating agent to the grease composition (see patent document 2) and the method of adding the bismuth dithiocarbamate thereto (see patent document 3) are incapable of solving the problem of the hydrogen brittleness-caused peeling phenomenon. In compliance with a demand for an increase in the generation amount of electricity, the compressed fluid-feeding machine is requested to have high performance and operated at a high speed. Accordingly the rolling bearing is rotated at high speed with a large load applied thereto, which causes the bearing portion to have a high temperature of about 180° C. Thus the rolling bearing is demanded to have excellent heat resistance.

The fan-coupling apparatus, the alternator, and the like which are electric auxiliary machines of a car are used to efficiently utilize the rotational torque of an engine through a one-way clutch which is connected to an engine output shaft only when the engine is in a predetermined output state.

Representative electric auxiliary machines for the car which operate through the one-way clutch includes the fan-coupling apparatus which feeds air most suitably in correspondence with the temperature of the engine and the alternator which generates electricity by receiving a rotation of the engine, supplies an electric power to an electric load of a vehicle, and charges a battery. These electric auxiliary machines are used to efficiently utilize the rotational torque of the engine through the one-way clutch to be connected to the engine output shaft only when the engine is in a predetermined output state. The one-way clutch mounted on the electric auxiliary machine for the car is frequently connected to and disconnected from the engine output shaft. When the one-way clutch is connected to the engine output shaft, it has a high rotational speed. Consequently a high load is applied to the one-way clutch, and it generates a large amount of heat and vibration. The use condition for the one-way clutch has become strict, as the car has come to have high performance and output.

When the use condition for the one-way clutch has become strict, the hydrogen brittleness-caused peeling phenomenon is liable to occur on rolling contact surfaces of balls of the one-way clutch, rolling surfaces of an outer ring for the clutch, and rolling surfaces of an inner ring for the clutch connected to a shaft on which the one-way clutch is mounted with these rolling contact surfaces and the contact surfaces turning into white in the textures thereof when a roller clutch overruns. In addition, when the one-way clutch is locked, there is a possibility that contact portions between these rolling contact surfaces and rolling surfaces are liable to fret. Therefore grease which is enclosed in a space where the rollers are mounted is desired to prevent the generation of the peeling and fretting phenomena.

The electric auxiliary machine on which the one-way clutch has been mounted is frequently installed on a lower portion of the engine room. Thus while a car is travelling, rainwater is liable to penetrate into the one-way clutch. When the rainwater penetrates into the space in which the rollers of the one-way clutch are mounted, the rolling contact surfaces of the rollers of the one-way clutch, the rolling surfaces of the outer ring for the clutch, and the rolling surfaces of the inner ring for the clutch connected to the shaft on which the one-way clutch is mounted are liable to corrode. Therefore the grease which is enclosed in the space in which the rollers are mounted is required to have rust-preventing performance superior to that of grease which is used in other portions.

In the conventional one-way clutch for use in the alternator, the one using grease containing ether oil as its base oil (see patent document 4), the one using grease whose viscosity pressure coefficient is not less than a predetermined value (see patent document 5), and the one using grease containing synthetic oil whose kinematic viscosity at 40° C. is not more than 60 mm$^2$/second as its base oil (see patent document 6) are known.

But in the patent document 4, the one-way clutch using the grease containing the ether oil as its base oil has a problem that the one-way clutch has an insufficient low frictional wear property when the one-way clutch is in an overrun state. In the patent document 5, the use of the grease whose viscosity pressure coefficient is not less than the predetermined value is effective for securely realizing a locked state, but has a problem that the grease is incapable of sufficiently restraining wear in the overrun state. In the patent document 6, the grease containing the synthetic oil whose kinematic viscosity is low as its base oil has an insufficient heat resistance. Thus it is difficult to use the grease for a long time.

Patent document 1: Japanese Patent Application Laid-Open No. 2003-105366

Patent document 2: Japanese Patent Application Laid-Open No. 3-210394

Patent document 3: Japanese Patent Application Laid-Open No. 2005-42102

Patent document 4: Japanese Patent Application Laid-Open No. 11-82688

Patent document 5: Japanese Patent Application Laid-Open No. 2000-234638

Patent document 6: Japanese Patent Application Laid-Open No. 2000-253620

DISCLOSURE OF THE INVENTION

Problems to be Solved by the Invention

The present invention has been made to solve the above-described problems. Therefore it is an object of the present invention to provide a grease composition capable of effectively preventing hydrogen brittleness-caused peeling from occurring on a rolling surface, a grease-enclosed bearing in which the grease composition is enclosed, and a one-way clutch in which the grease composition is enclosed.

Means for Solving the Problems

The grease composition of the present invention for preventing a frictionally worn surface of a sliding portion or a newly generated surface consisting of iron or the like exposed owing to wear from being peeled by hydrogen brittleness. The grease composition is composed of a base grease consisting of a base oil and a thickener and an additive added to the base grease. The additive contains at least one aluminum-based additive selected from among an aluminum powder and inorganic aluminum compounds.

A mixing ratio of the aluminum-based additive to 100 parts by weight of the base grease is set to 0.05 to 10 parts by weight.

The inorganic aluminum compound is at least one compound selected from among aluminum carbonate, aluminum nitrate, and aluminum sulfate.

The thickener is a urea-based thickener or a lithium soap-based thickener.

The base oil is at least one oil selected from among alkyldiphenyl ether oil, poly-α-olefin oil, and ester oil.

A kinematic viscosity of the base oil at 40° C. is 30 to 200 mm$^2$/s.

The above-described grease composition is enclosed in the grease-enclosed bearing of the present invention. As the grease-enclosed bearing, a rolling bearing for use in an electric auxiliary machine of a car, a rolling bearing for a fuel cell system, a rolling bearing for a motor, and a rolling bearing for a robot are listed.

The one-way clutch of the present invention, to be mounted an output member, has an outer ring for the clutch and a plurality of rollers provided on an inside-diameter surface of the outer ring, only a one-direction torque of the outer ring for the clutch is transmitted to the output member via the rollers; and a grease composition of the present invention is enclosed in an internal space of the clutch in which a plurality of the rollers are mounted.

Effect of the Invention

In the grease composition of the present invention, at least one aluminum-based additive selected from among the aluminum powder and the inorganic aluminum compound is added to the base grease consisting of the base oil and the thickener. Therefore it is possible to restrain the hydrogen brittleness-caused peculiar peeling from occurring on the surface of metal such as the rolling surface of the bearing with the rolling surface turning into white in its texture.

Consequently by enclosing the grease composition of the present invention in the bearing, it is possible to restrain the hydrogen brittleness-caused peculiar peeling from occurring in the rolling bearing for use in the electric auxiliary machine of a car, the bearing for use in the motor, the rolling bearing for use in the fuel cell system, and the like in which the cycle of start—sudden acceleration drive—high speed drive—sudden deceleration drive—sudden stop is frequently repeated. Therefore the bearing can be used for a long time. It is also possible to restrain the hydrogen brittleness-caused peculiar peeling from occurring in the rolling bearing for use in a robot in which each time switching of stop—start—drive—stopping operation is made, the rolling bearing is subjected to frequent high accelerations and decelerations because the number of times of the switching of stop—start—drive—stopping operation is large per time. Therefore the rolling bearing can be used for a long time.

In addition to the prevention of the occurrence of the hydrogen brittleness-caused peeling, the one-way clutch in which the grease composition of the present invention is enclosed is capable of maintaining the effect of an extreme-pressure property for a long time, because the grease containing the aluminum-based additive excellent in the heat resistance and durability is used for the one-way clutch. Therefore it is possible to effectively prevent the hydrogen brittleness-caused peeling from occurring on rolling contact surfaces of rollers of the one-way clutch with the rolling contact surfaces turning into white in the texture thereof and prevent them from fretting. Thereby it is possible to maintain the wear resistance and durability of the one-way clutch for a long time.

BEST MODE FOR CARRYING OUT THE INVENTION

As a result of the energetic investigation of a method of effectively preventing the hydrogen brittleness-caused peeling from occurring on the rolling surface of the grease-enclosed rolling bearing, the present inventors have conducted a sudden acceleration/deceleration test and found that the lifetime of the bearing can be prolonged by using the rolling bearing in which the grease composition containing at least one aluminum-based additive selected from among the aluminum powder and the inorganic aluminum compound is enclosed.

The analysis of the rolling surface of the bearing has revealed that by adding the aluminum-based additive to the base grease, the aluminum-based additive makes a reaction on the frictionally worn surface of a bearing portion containing the iron-based metal material or on the newly generated surface of the metal exposed owing to wear to form a film containing iron oxide and aluminum or an aluminum compound on the rolling surface of the bearing.

It is considered that the film containing the iron oxide and the aluminum or the aluminum compound formed on the rolling surface of the bearing restrains the generation of hydrogen caused by the decomposition of the grease composition and the penetration of the hydrogen into the bearing steel, thereby preventing the hydrogen brittleness-caused peculiar peeling from occurring and thus prolonging the life of the bearing. The present invention is completed on the basis of the above-described findings.

The aluminum-based additive contained in the grease composition of the present invention is at least one substance selected from an aluminum powder and inorganic aluminum compounds.

As the aluminum powder that can be used in the present invention, it is possible to use powder having an average particle diameter not more than 150 μm and preferably not more than 50 μm. When the average particle diameter of the aluminum powder is more than 150 μm, the aluminum powder is inferior in a reaction with the newly generated surface of the metal. As examples of the aluminum powder, aluminum powder produced by Wako Pure Chemical Industries, Ltd. and Koujundo Chemical Laboratory Co., Ltd. are listed.

As the inorganic aluminum compound that can be used in the present invention, aluminum carbonate, aluminum sulfide, aluminum chloride, aluminum nitrate, and hydrates thereof, aluminum sulfate, aluminum fluoride, aluminum bromide, aluminum iodide, aluminum oxyfluoride, aluminum oxychloride, aluminum oxybromide, aluminum oxyiodide, aluminum oxide, and hydrates thereof, aluminum hydroxide, aluminum selenide, aluminum telluride, aluminum phosphate, aluminum phosphide, lithium aluminate, magnesium aluminate, aluminum selenide, aluminum oxyperchlorate, aluminum oxysulfate, aluminum titanate, aluminum zirconate, and aluminum molybdate are listed.

In the present invention, the aluminum powder is especially favorable because it is excellent in the resistance to heat and durability and hardly heat-decomposable and thus have a high extreme-pressure property effect.

The aluminum carbonate, the aluminum nitrate, the aluminum sulfate or mixtures of these substances are preferable because these substances are excellent in reactivity with the frictionally worn surface or the newly generated surface of the iron-based metal material exposed owing to wear.

These aluminum-based additives may be added to the grease singly or as a mixture of two or more kinds thereof.

The mixing ratio of the aluminum-based additive to 100 parts by weight of the base grease is set to 0.05 to 10 parts by weight. That is, (1) when the aluminum-based additive consists of the aluminum powder, 0.05 to 10 parts by weight of the aluminum powder is added to 100 parts by weight of the base grease; (2) when the aluminum-based additive consists of the aluminum compound, 0.05 to 10 parts by weight of the aluminum compound is added to 100 parts by weight of the base grease; (3) when the aluminum-based additive consists of the aluminum powder and the aluminum compound, 0.05 to 10 parts by weight of a mixture of the aluminum powder and the aluminum compound is added to 100 parts by weight of the base grease.

When the mixing ratio of the aluminum-based additive to 100 parts by weight of the base grease is less than 0.05 parts by weight, it is impossible to effectively prevent the hydrogen brittleness-caused peeling from occurring on the rolling surface. When the mixing ratio of the aluminum-based additive is more than 10 parts by weight, it is impossible to improve the peeling-preventing effect to a higher extent.

As the base oil which can be used in the present invention, it is possible to list mineral oil such as spindle oil, refrigeration oil, turbine oil, machine oil, dynamo oil; hydrocarbon synthetic oil such as highly refined mineral oil, liquid paraffin, polybutene, GTL base oil synthesized by Fischer-Tropsh method, poly-α-olefin oil, alkylnaphthalene, alicyclic compounds; and non-hydrocarbon synthetic oil such as natural fats and oils, polyol ester oil, phosphate ester oil, polymer ester oil, aromatic ester oil, carbonate ester oil, diester oil, polyglycol oil, silicone oil, polyphenyl ether oil, alkyldiphenyl ether oil, alkylbenzene oil, fluorinated oil.

Of these base oils, it is preferable to use the alkyldiphenyl ether oil, the poly-α-olefin oil, the polyol ester oil, and the mineral oil excellent in the heat resistance and the lubricating property thereof.

As the above-described poly-α-olefin oil, mixtures of oligomers or polymers consisting of α-olefin or isomerized α-olefin are listed. As examples of the α-olefin, it is possible to list 1-octene, 1-nonen, 1-decene, 1-dodecene, 1-tridecene, 1-tetradecene, 1-pentadecene, 1-hexadecene, 1-heptadecene, 1-octadecene, 1-nonadecene, 1-eicosene, 1-docosene, and 1-tetracosene. Normally mixtures of these substances are used. As the mineral oil, it is possible to use any of normal lubricants such as paraffin mineral oil, naphthene mineral oil, and the like and those used in the field of grease.

It is preferable that the base oil which can be used in the present invention has a kinematic viscosity of 30 to 200 mm$^2$/s at 40° C. It is not preferable that the base oil has a kinematic viscosity less than 30 mm$^2$/s because the evaporation loss thereof increases and the resistance thereof to heat deteriorates. It is not preferable that the kinematic viscosity of the base oil exceeds 200 mm$^2$/s because owing to an increase in a rotational torque, the temperature at rolling contact surfaces of rollers of the one-way clutch and those of balls of the rolling bearing rise greatly.

As thickeners that can be used in the present invention, it is possible to use soaps such as Benton, silica gel, fluorine compounds, lithium soap, lithium complex soap, sodium soap, calcium soap, calcium complex soap, aluminum soap, aluminum complex soap; and urea-based compounds such as a diurea-based compound, a polyurea-based compound, and the like. These thickeners can be used singly or in combination of two or more kinds.

Of these thickeners, the urea-based compounds or the lithium soap-based compounds are favorable. The urea-based compound is especially favorable in consideration of heat resistance, cost, and the like.

Of the above-described urea-based compound, the diurea-based compounds shown by a formula (1) shown below is more favorable.

[Chemical Formula 1]

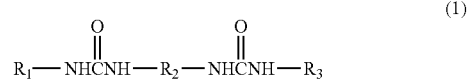

(1)

$R_1$ and $R_3$ in the formula (1) indicate hydrocarbon radicals having carbon atoms of 6 to 20. $R_1$ and $R_3$ may be identical to or different from each other. $R_2$ indicates an aromatic hydrocarbon radical having carbon atoms of 6 to 15.

The urea-based compound is obtained by a reaction between an isocyanate compound and an amine compound. To prevent a reactive free radical from remaining, it is preferable to use the isocyanate group of the isocyanate compound and the amino group of the amine compound in an approximately equivalent weight.

The diurea-based compound indicated by the formula (1) is obtained by reaction of diisocyanate and monoamine. As the diisocyanate, phenylene diisocyanate, diphenyl diisocyanate, diphenylmethane diisocyanate, 1,5-naphthylene diisocyanate, 2,4-trilene diisocyanate, 3,3-dimethyl-4,4-biphenylene diisocyanate, octadecane diisocyanate, decane diisocyanate, and hexane diisocyanate are listed. As the monoamine, octylamine, dodecylamine, hexadecylamine, stearylamine, oleylamine, aniline, p-toluidine, and cyclohexylamine are listed.

The polyurea-based compound is obtained by reaction between diisocyanate and monoamine as well as diamine. As the diisocyanate and the monoamine, substances similar to those used to form the diurea-based compound are listed. As the diamine, ethylenediamine, propanediamine, butanediamine, hexanediamine, octanediamine, phenylenediamine, tolylenediamine, xylenediamine, and diaminodiphenylmethane are listed.

As examples of the lithium soap, lithium laurate ($C_{12}$), lithium myristate ($C_{14}$), lithium palmitate ($C_{16}$), lithium margarate ($C_{17}$), lithium stearate ($C_{18}$), lithium arachidate ($C_{20}$), lithium behenate ($C_{22}$), lithium lignocerate ($C_{24}$), tallow fatty lithium, lithium ricinolate, and lithium ricinelaidate are listed. As especially preferable lithium soap, the lithium stearate and lithium 12-hydroxystearate are listed.

By adding the thickener such as the urea-based compound to the base oil, it is possible to obtain the base grease to which the aluminum-based additive or the like is added. The base grease containing the urea-based compound as its thickener is produced by the reaction between the isocyanate compound and the amine compound in the base oil.

As the mixing ratio of the thickener to the base grease, favorably 1 to 40 parts by weight of the thickener and more favorably 3 to 25 parts by weight thereof is added to 100 parts by weight of the base grease. If the content of the thickener is less than one part by weight, the thickening effect is small and greasing is difficult. If the content of the thickener is more than 40 parts by weight, obtained grease is so hard that it is difficult to obtain a desired effect.

It is preferable that the worked penetration of the grease to be enclosed in the one-way clutch is in the range from 200 to 400. If the worked penetration thereof is less than 200, the lubricating performance of the grease composition at a low temperature is low. If the worked penetration exceeds 400, the grease composition is liable to leak, which is not preferable.

As may be necessary, known additives for grease can be contained together with the aluminum-based additive. As additives that can be added to the base grease, it is possible to use an antioxidant such as an organic zinc compound, antioxidants containing amine, phenol; a metal-inactivating agent such as benzotriazole; a viscosity index improver such as polymethacrylate and polystyrene; a solid lubricant such as molybdenum disulfide and graphite; a corrosion inhibitor such as metal sulfonate and polyvalent alcohol ester; a friction-reducing agent such as organic molybdenum; an oily agent such as ester and alcohol; and a wear-preventing agent such as a phosphorous compound. These additives can be added to the grease singly or in combination.

The grease composition of the present invention is capable of restraining the hydrogen brittleness-caused peculiar peeling. Therefore it is possible to prolong the life of the grease-enclosed bearing. Thus the grease composition of the present invention can be used for a ball bearing, a cylindrical roller bearing, a tapered roller bearing, an automatic belt-training roller bearing, a needle-shaped roller bearing, a thrust cylindrical roller bearing, a thrust tapered roller bearing, a thrust needle-shaped roller bearing, and a thrust automatic belt-training roller bearing.

The grease-enclosed bearing in which the grease composition of the present invention is enclosed is described with reference to FIG. 1. FIG. 1 is a sectional view of a deep groove ball bearing. For example, a rolling bearing, for use in an electric auxiliary machine of a car, for rotatably supporting a rotary shaft driven by an engine output on a stationary member; a grease-enclosed bearing, for a motor, for supporting a rotor of the motor; a rolling bearing, for use in a robot, for rotatably supporting a rotational portion of an industrial robot; and a rolling bearing for a fuel cell system are exemplified.

In a grease-enclosed bearing 1, an inner ring 2 having an inner ring rolling surface 2a on its peripheral surface and an outer ring 3 having an outer ring rolling surface 3a on its inner peripheral surface are concentrically disposed, and a plurality of rolling elements 4 is disposed between the inner ring rolling surface 2a and the outer ring rolling surface 3a. A sealing member 6 fixed to a retainer 5 holding the rolling elements 4 and to the outer ring 3 is provided at openings 8a and 8b disposed at both axial ends of the inner ring 2 and the outer ring 3. A grease composition 7 is essentially applied to the peripheries of the rolling elements 4.

FIGS. 2 and 3 show an example of an electric auxiliary machine of a car in which a rolling bearing for use in the electric auxiliary machine for the car is used. FIG. 2 is a sectional view of a fan coupling apparatus. Inside a casing 10 supporting a cooling fan 9 of the fan-coupling apparatus, there are provided an oil chamber 11 in which a viscous fluid such as silicone oil is filled and a stirring chamber 12 in which a drive disk 18 is incorporated. A port 14 is formed on a partitioning plate 13 interposed between both chambers 11 and 12. An end of a spring 15 for opening and closing the port 14 is fixed to the partitioning plate 13.

A bimetal 16 is mounted on a front surface of the casing 10. A piston 17 of the spring 15 is provided on the bimetal 16. When the temperature of air that has passed through a radiator is not more than a set temperature, for example, 60° C., the bimetal 16 becomes flat. As a result, the piston 17 presses the spring 15, and the spring 15 closes the port 14. When the temperature of the air exceeds the set temperature, the bimetal 16 curves outward as shown in FIG. 3. As a result, the piston 17 does not press the spring 15. Thus the spring 15 deforms elastically and opens the port 14.

Supposing that the temperature of the air that has passed through the radiator is lower than the set temperature of the bimetal 16 when the fan-coupling apparatus having the above-described construction is operated, as shown in FIG. 2, the viscous fluid inside the oil chamber 11 does not flow into the stirring chamber 12 because the port 14 is closed with the spring 15. At this time, the viscous fluid inside the stirring chamber 12 is fed from a circulation hole 19 formed on the partitioning plate 13 into the oil chamber 11 owing to a rotation of the drive disk 18.

Therefore the amount of the viscous fluid inside the stirring chamber 12 becomes slight. Because a shear resistance of the viscous fluid generated owing to the rotation of the drive disk 18 becomes small, a decreased torque is transmitted to the casing 10. Thus the fan 9 rotates at a low speed.

When the temperature of the air that has passed through the radiator exceeds the set temperature of the bimetal 16, as shown in FIG. 3, the bimetal 16 curves outward, and the piston 17 does not press the spring 15. At this time, the spring 15 deforms elastically in a direction in which the spring 15 moves away from the partitioning plate 13. Thus the port 14 is opened. Thereby the viscous fluid inside the oil chamber 11 flows into the stirring chamber 12 from the port 14.

Therefore the shear resistance of the viscous fluid generated owing to the rotation of the drive disk 18 becomes large. Thus an increased rotational torque is transmitted to the casing 10, and the fan 9 supported by the rolling bearing rotates at a high speed.

As described above, since in the fan-coupling apparatus, the rotational speed of the fan 9 changes in dependence on the change of temperature, warming-up is made fast, and overcooling of cooling water is prevented. Thereby the engine can be effectively cooled. When the temperature of the engine is low, the fan 9 is placed in a state in which the fan 9 is disconnected from a driving shaft 20. On the other hand, when the temperature of the engine is high, the fan 9 is placed in a state in which the fan 9 is connected to the driving shaft 20. As such, the rolling bearing 1 is used in a wide range from a low temperature to a high temperature and a wide range of rotation.

FIG. 4 shows an example of the construction of an alternator of an electric auxiliary machine of a car. FIG. 4 is a sectional view of the alternator. In the alternator, through a pair of grease-enclosed rolling bearings 1, a rotating shaft 23 on which a rotor 22 is mounted is rotatably supported by a pair of stationary frames 21a and 21b which form a housing. A rotor coil 24 is mounted on the rotor 22. Three stator coils 26 are mounted at a phase of 120 degrees on a stator 25 disposed on the periphery of the rotor 22.

A rotational shaft 23 of the rotor 22 is driven by a rotational torque transmitted to a pulley 27 mounted on the front end thereof through a belt (not shown in FIG. 4). The pulley 27 is mounted on the rotational shaft 23 in a cantilevered state. Vibrations are generated when the rotational shaft 23 rotates at a high speed. Thus a grease-enclosed rolling bearing 1 supporting the pulley 27 is subjected to a very high load.

FIG. 5 shows an example of an idler pulley used as a belt tensioner which tensions a belt for driving the auxiliary parts of the car. FIG. 5 is a sectional view showing the construction of the idler pulley.

The pulley has a body 28 made of a steel plate press and a grease-enclosed rolling bearing 1 which is a one-row deep groove ball bearing fitted on the inner periphery of the body 28. The body 28 is an annular body constructed of an inner cylindrical part 28a, a flange part 28b extending from one end of the inner cylindrical part 28a to the periphery of the body 28, an outer cylindrical part 28c extending axially from the flange part 28b, and a collar 28d extending from the other end of the inner cylindrical part 28a to the inner periphery of the body 28. An outer ring 3 of the grease-enclosed rolling bearing 1 is fitted on the inner periphery of the inner cylindrical part 28a. A peripheral surface 28e that contacts a belt driven by the engine is provided on the periphery of the outer cylindrical part 28c. The peripheral surface 28e is brought into contact with the belt to allow the pulley to serve as an idler.

The grease-enclosed rolling bearing 1 has the outer ring 3 fitted on the inner periphery of the inner cylindrical part 28a of the body 28, an inner ring 2 fitted on an unshown fixed shaft, a plurality of rolling elements 4 disposed between a rolling surface 2a of the inner ring 2 and a rolling surface 3a of the outer ring 3, a retainer 5 for holding the rolling elements 4 circumferentially at regular intervals, and a pair of sealing members 6 sealing the grease. The inner ring 2 and the outer ring 3 are formed integrally.

By adding at least one aluminum-based additive selected from among an aluminum powder and inorganic aluminum compounds to the grease composition for the electric auxiliary machine of a car, the aluminum powder sticks to the frictionally worn surface of a bearing portion containing the iron-based metal material or to the newly generated surface of the metal exposed owing to wear or the aluminum compound makes a reaction thereon to form the film containing the iron oxide and the aluminum or the aluminum compound on the rolling surface of the bearing. As the aluminum compound, aluminum oxide and the like can be used.

The film generated on the rolling surface of the bearing restrains the generation of hydrogen caused by the decomposition of the grease composition and is capable of preventing the occurrence of the hydrogen brittleness-caused peculiar peeling.

FIG. 6 shows an example of a motor using a grease-enclosed bearing for use in a motor. FIG. 6 is a sectional view of the construction of the motor. The motor has a stator 102 consisting of a magnet, for the motor, disposed on the inner peripheral wall of a jacket 101, a rotor 105 on which a coil 104 fixed to a rotating shaft 103 is wound, a commutator 106 fixed to the rotating shaft 103, a brush holder 107 disposed on an end frame 109 supported by the jacket 101, and a brush 108 accommodated inside the brush holder 107. The rotating shaft 103 is rotatably supported on the jacket 101 by a grease-enclosed bearing 1 and a supporting construction for the bearing 1.

General-purpose motors such as an AC motor, a DC motor, and the like have become smaller. Hence there is a tendency that the bearing is driven under a higher surface pressure. The following motors are subjected to frequent repetition of start—sudden acceleration operation—high-speed operation—sudden deceleration operation—sudden stop: electric motors for industrial machines such as a servomotor for industrial machines; and motors for electric apparatuses such as a starter motor for a vehicle, an electromotive power steering motor, a steering-adjusting tilt motor, a blower motor, a wiper motor, a power window motor. Thus rolling bearings for motors have sliding to a higher extent. As the use conditions of the motors have become strict, the peculiar peeling phenomenon occurs in an early stage with the rolling surface of the bearing turning into white in its texture. Therefore the rolling bearing for use in the motor is demanded to have durability which enables the rolling bearing to be driven stably for a long time and have reliability.

By adding at least one aluminum-based additive selected from among an aluminum powder and inorganic aluminum compounds to the grease composition to be enclosed in the rolling bearing for the motor, the aluminum powder stick to the frictionally worn surface of the bearing portion containing the iron-based metal material or to the newly generated surface of the metal exposed owing to wear or the aluminum compound makes a reaction thereon to form the film containing the iron oxide and the aluminum or the aluminum compound on the rolling surface of the bearing. As the aluminum compound, aluminum oxide can be used.

The film generated on the rolling surface of the bearing restrains the generation of hydrogen caused by the decomposition of the grease composition and prevents the penetration of hydrogen which may be generated from water, contained in air inside the bearing, which is electrolyzed by electric current flowing through the motor, thus preventing the occurrence of the hydrogen brittleness-caused peculiar peeling.

FIG. 7 shows an example of a compressed fluid-feeding machine in which the rolling bearing of the present invention for use in a fuel cell system is used. FIG. 7 is a sectional view of an impeller-type compressed fluid-feeding machine for use in a fuel cell car. Arrows shown with one-dot chain line in FIG. 7 indicate a direction in which a gas flows.

As shown in FIG. 7, the impeller-type compressed fluid-feeding machine is so constructed that a rotation shaft 202 to which an impeller 201 is fixed is supported on a casing 203 by means of a plurality of rolling bearings 1 axially disposed at certain intervals. When the rotation shaft 202 rotates at a high speed upon receipt of a power of a motor or the like, the impeller 201 also rotates at a high speed. Thereby a gas sucked from a gas-sucking port 204 is pressurized by a centrifugal force of the impeller 201 and fed under pressure from a gas-discharging port 207 through a pressure volute 206 formed with the casing 203 and a back plate 205.

To prevent the gas from leaking from the pressure volute 206 to the grease-enclosed bearing 1, the backplate 205 and the rotation shaft 202 are sealed with the seal ring 209 interposed therebetween. But in the impeller-type compressed fluid-feeding machine, when the sealing performance of the seal ring 209 deteriorates owing to a high-speed rotation of the rotation shaft 202, the gas reaches the bearing 1 from a rear space 208 disposed rearward from the impeller 201 through a gap 210 between the rotation shaft 202 and the seal ring 209. To prevent the occurrence of this phenomenon, a mechanical seal 211 is provided. Regarding the sealing performance of the mechanical seal 211, a sliding-contact surface between the mechanical seal 211 and the rotation shaft 202 is lubricated with vapor contained in the gas. Thus as it stands, the vapor leaks and penetrates into the bearing 1. As a result of the penetration of the vapor or the like into the bearing 1, there is a fear that the bearing 1 deteriorates.

Therefore in the rolling bearing of the present invention for use in the fuel cell system, to prevent the penetration of the vapor from the impeller 201 into the bearing 1 and prevent the leak of the grease composition 7 (see FIG. 1) enclosed inside the bearing 1, the bearing 1 is provided with the sealing member 6 (see FIG. 1) resistant to the hydrogen brittleness.

By adding at least one aluminum-based additive selected from among an aluminum powder and inorganic aluminum compounds to the grease composition for the rolling bearing for use in the fuel cell system, the aluminum powder stick to the frictionally worn surface of a bearing portion containing the iron-based metal material or to the newly generated surface of the metal exposed owing to wear or the aluminum compound makes a reaction thereon to form the film containing the iron oxide and the aluminum or the aluminum compound on the rolling surface of the bearing. As the aluminum compound, aluminum oxide can be used.

The film generated on the rolling surface of the bearing restrains the generation of hydrogen caused by the decomposition of the grease composition and prevents the penetration of hydrogen which may be generated by electrolyzation from water constantly supplied inside the fuel cell system, thus preventing the occurrence of the hydrogen brittleness-caused peculiar peeling.

The one-way clutch for which the grease composition of the present invention is used is described below with reference to FIG. 8. FIG. 8 is a sectional view showing the one-way clutch of one embodiment of the present invention. This embodiment shows an example of a rotation-transmitting apparatus with a built-in one-way clutch which is a utilized form using the one-way clutch and the rolling bearing in combination.

A rotation-transmitting apparatus 301 with a built-in one-way clutch has a pulley 303 (outside rotational member) and a sleeve 302 (inside rotational member) 302, coupled to an output member, which is disposed concentrically with the pulley 303 as a pair of rotational members. A pair of grease-enclosed bearings 1, 1 and a one-way clutch 304 are provided between an inside surface of the pulley 303 and an outside surface of the sleeve 302.

The pulley 303 is formed entirely cylindrically, and by waving a sectional configuration of the outside surface thereof in a widthwise direction thereof, a part of an annular belts called a poly V-belt can be spanned freely. The sleeve 302 is formed entirely cylindrically and is fixedly fitted on a rotational shaft of an auxiliary machine such as an alternator to freely rotate the sleeve 302 together with the rotational shaft. At both ends of a cylindrical space disposed between the inside surface of the pulley 303 and the outside surface of the sleeve 302, the grease-enclosed bearings 1, 1 are mounted at a position where the one-way clutch 304 is sandwiched between both sides thereof in the axial direction thereof, and the one-way clutch 304 is installed at an intermediate portion of the cylindrical space in its axial direction.

The one-way clutch 304 freely transmits a rotational force between the pulley 303 and the sleeve 302 only when the pulley 303 rotates in a predetermined speed relative to the sleeve 302. The one-way clutch 304 is constructed of an outer ring 306 for the clutch, an inner ring 305 for the clutch, a plurality of rollers 307, a retainer 308 for the clutch, and a spring 317 (see FIG. 9). The outer ring 306 for the clutch and the inner ring 305 for the clutch are fixedly fitted on the inside surface of the intermediate portion of the pulley 303 and the outside surface of the intermediate portion of the sleeve 302 respectively by shrink fit. The inside surface of the intermediate portion of the outer ring 306 for the clutch is set as merely a cylindrical surface. The outside surface of the inner ring 305 for the clutch is formed as a cam surface 309. That is, a plurality of concavities 310 called a lamp portion is formed at regular intervals in the circumferential direction of the outside surface of the inner ring 305 for the clutch to form the outside surface of the inner ring 305 for the clutch as the cam surface 309.

Between the inside surface of the intermediate portion of the outer ring 306 and the cam surface 309, a plurality of the rollers 307 and the retainer 308, for the clutch, for supporting the rollers 307 in correspondence to rolling thereof and a small amount of displacement thereof in the circumferential direction thereof. The retainer 308 for the clutch is entirely made of synthetic resin. An inner peripheral edge of the retainer 308 for the clutch is engaged by a part of the cam surface 309 to prevent the retainer 308 from rotating at a speed not higher than the inner ring 305 for the clutch. In the example shown in FIG. 8, a convexity 311 formed on the inside surface of an end of the retainer 308 for the clutch is sandwiched between a level-different surface 312 formed on the outside surface of the sleeve 302 and an axial end surface of the inner ring 305 for the clutch to axially place the retainer 308 for the clutch in position.

As shown in FIGS. 9(a) and 9(b) which are sectional views in the circumferential direction of the one-way clutch, between a roller 307 and a retainer 308 for the clutch, there is provided a spring 317 for pressing the roller 307 in the same direction (direction in which concavity 310 become shallow) as the circumferential direction. The grease composition of the present invention is enclosed on the periphery of each roller 307.

As shown in FIG. 9(a), when the outer ring 306 for the clutch rotates in a direction shown with an arrow (clockwise) relative to an inner ring 305 for the clutch, owing to a spring action of a spring 317, each roller 307 advances to an engaging position of a concavity 310 of the inner ring 305 for the clutch. Owing to a wedge action between a cam surface 309 of the inner ring 305 for the clutch and the inside-diameter surface of the outer ring 306 for the clutch, the inner ring 305 for the clutch is driven. As shown in FIG. 9(b), when the outer ring 306 for the clutch rotates in a direction shown with an arrow (counterclockwise) relative to the inner ring 305 for the clutch, the inner ring 305 for the clutch rotates clockwise relative to the outer ring 306 for the clutch. As a result, the rollers 307 separate from the cam surface 309 of the inner ring 305 for the clutch, and the outer ring 306 idles relative to the inner ring 305 for the clutch.

A pair of the grease-enclosed bearings 1, 1 allow the pulley 303 to rotate relative to the sleeve 302 with the grease-enclosed bearings 1, 1 supporting a radial load applied to the pulley 303. As the grease-enclosed bearings 1, 1, deep groove ball bearings are used in FIG. 8. That is, as shown in detail in FIG. 1 which is a sectional view of the deep groove ball bearing, each of the grease-enclosed bearings 1, 1 has an inner ring 2 having a deep-groove inner ring rolling surface 2a on its outside surface and fixedly fitted on both ends of a sleeve 302, an outer ring 3 having a deep-groove outer ring rolling surface 3a on its inside surface and fixedly fitted on both ends of a pulley 303, and a plurality of rolling elements (balls) 4 which can be rolled and disposed between the inner ring rolling surface 2a and the outer ring rolling surface 3a with the rolling elements 4 held by a retainer 5. Both-end openings of a space, where balls 4 are provided, which is disposed between the outside surface of the inner ring 2 and the inside surface of the outer ring 3 are sealed with a sealing member 6. A grease composition 7 of the present invention is enclosed on the periphery of each roller 4.

In the rotation-transmitting apparatus 301 with the built-in one-way clutch having the above-described construction, the sleeve 302 is fixedly fitted on the end of the rotational shaft of an electric auxiliary machine of a car such as an alternator, and the annular belt is spanned over the outside surface of the pulley 303. The annular belt is spanned on a driving pulley fixed to an end of a crankshaft of an engine and is driven by rotation of the driving pulley. In the one-way clutch 304 in which the component parts are assembled in this manner, when the travel speed of the annular belt becomes low, the rotation of the pulley 303 relative to the rotational shaft is free. On the other hand, when the travel speed of the annular belt is constant or becomes high, the rotational force is freely transmitted from the pulley 303 to the rotational shaft. Consequently even when the rotational angular speed of the crankshaft fluctuates, it is possible to prevent the pulley 303 and the annular belt from rubbing each other, an abnormal sound called judder from being generated, the life of the annular belt from being decreased by wear, and the alternator from deteriorating in its power generation efficiency.

Supposing that one of the electric motor of the electric auxiliary machine of a car and the engine is in operation and the other is in a stopped state, by using the one-way clutch, it is possible to freely transmit a rotational force from the rotational shaft of one of the electric motor and the engine to the pulley 303 and prevent the rotation of the rotational shaft of the other. For example, by mounting the one-way clutch on the end of the electric motor of the electric auxiliary machine of a car and on the end of the driving shaft of the crankshaft, the one-way clutch can be utilized as an auxiliary machine-driving apparatus when the engine is at an idle stop time.

As the one-way clutch of the present invention, in addition to the above-described type using the bearing (or other roller) and the one-way clutch in combination, it is possible to use a form not using the bearing or the like in combination with the one-way clutch, when a small radial load is applied to the one-way clutch.

As a result of investigation of the one-way clutch in which grease containing an extreme-pressure agent is enclosed, it has been found that the one-way clutch in which grease containing 0.05 to 10 parts by weight of the aluminum-based additive added to 100 parts by weight of the base grease as the additive is enclosed has a lower degree of wear and a more favorable long-term durability than the one-way clutch in which grease containing an additive other than the aluminum-based additive is enclosed, when the one-way clutches are making a sliding motion with a high load being applied thereto.

This is because the aluminum-based additive is superior to substances other than the aluminum-based additive in the heat resistance and durability thereof and less heat-decomposable. Thus it is considered that the aluminum-based additive allows the grease to keep an extreme-pressure property effect for a long time and that the film, containing the iron oxide and the aluminum or the aluminum oxide, which is generated on the rolling surface of the bearing restrains the occurrence of the hydrogen brittleness-caused peeling.

EXAMPLES

Examples 1-1 Through 1-8 and Examples 2-1 Through 2-8

4,4'-diphenylmethane diisocyanate (MillionateMT (commercial name) produced by Nippon Polyurethane Industry Co., Ltd., hereinafter referred to as MDI) was dissolved in one half of a base oil shown in tables 1 and 2 at a ratio shown in tables 1 and 2. Monoamine was dissolved in the remaining half of the base oil at an equivalent weight two times larger than that of the MDI. The mixing ratio of each of the MDI and the monoamine is as shown in tables 1 and 2.

The solution in which the monoamine was dissolved was added to the solution in which the MDI was dissolved while the solution in which the MDI was dissolved was being stirred. The stirring continued for 30 minutes at 100 to 120° C. for reaction to form a diurea-based compound in the base oil.

The aluminum-based additive and an antioxidant were added to the base oil at mixing ratios shown in tables 1 and 2. The base oil was stirred at 100 to 120° C. for 10 minutes. Thereafter the base oil was cooled and homogenized by a three-roll mill to obtain a grease composition.

In tables 1 and 2, as synthetic hydrocarbon oil and alkyldiphenyl ether oil both used as the base oil, Shin-fluid 601 (commercial name), produced by Nippon Steel Chemical Co., Ltd., which has a kinematic viscosity of 30 mm$^2$/second at 40° C. and MorescoHilubeLB100 (commercial name), produced by Matsumura Oil Research Corp., which has a kinematic viscosity of 97 mm$^2$/second at 40° C. were used respectively. As the antioxidant, hindered phenol produced by Sumitomo Chemical Co., Ltd. was used in the examples 1-1 through 1-8, and alkylated diphenylamine was used in examples 2-1 through 2-8.

A sudden acceleration/deceleration test 1 was conducted on specimen bearings in which the obtained grease compositions were enclosed respectively. The test method and the test condition are shown below. The results are shown in tables 1 and 2.

<Sudden Acceleration/Deceleration Test 1>

The grease composition of each of the examples was enclosed in a rolling bearing which supported a rotating shaft of an alternator which is an example of an electric auxiliary machine by an inner ring. The rotating shaft supported a pulley around which a rotating belt was wound. In this manner, specimen bearings were obtained. The sudden acceleration/deceleration test 1 was conducted on the obtained rolling bearing. The condition of the sudden acceleration/deceleration test 1 was that as the drive condition, a load of 1960 N was applied to each specimen bearing mounted on the tip of the rotational shaft, and the rotational speed was set to 0 to 18000 rpm. The test was conducted in a state in which electric current of 0.1 A flowed through the specimen bearings. The time (lifetime h limited by occurrence of peeling) when a generator stopped because peculiar peeling occurred inside the specimen bearing and the vibration of a vibration detector exceeded a predetermined value was measured. The test was conducted for not more than 500 hours.

Comparative Examples 1-1 Through 1-3 and 2-1 Through 2-3

In a method similar to the method of the example 1-1, base grease was prepared by selecting a thickener and a base oil at mixing ratios shown in tables 1 and 2 and in addition, adding an additive to the base grease to obtain a grease composition of each comparative example. A test was conducted on each grease composition in a manner similar to that of the example 1-1 to evaluate the grease compositions. Results are shown in tables 1 and 2.

TABLE 1

| Components of grease composition | Example | | | | | |
|---|---|---|---|---|---|---|
| and mixing ratios (part by weight) | 1-1 | 1-2 | 1-3 | 1-4 | 1-5 | 1-6 |
| Base grease | | | | | | |
| Base oil | | | | | | |
| Synthetic hydrocarbon oil[1)] | — | 15 | 63 | 15 | 15 | 15 |
| Alkyldiphenyl ether oil[2)] | 80 | 63 | 15 | 63 | 63 | 63 |
| Thickener | | | | | | |
| Amine: Octylamine | — | — | — | 5.8 | — | — |
| Amine: p-toluidine | 9.2 | 10.1 | 10.1 | 4.9 | 10.1 | 10.1 |
| Diisocyanate: MDI[3)] | 10.8 | 11.9 | 11.9 | 11.3 | 11.9 | 11.9 |
| (Total of parts by weight of components) | (100) | (100) | (100) | (100) | (100) | (100) |
| Additive | | | | | | |
| Antioxidant[4)] | 1 | 1 | 1 | 1 | 1 | 1 |
| Aluminum powder[5)] | 1 | 1 | 1 | 1 | 0.1 | 5 |
| Aluminum carbonate[6)] | — | — | — | — | — | — |
| Aluminum nitrate[7)] | — | — | — | — | — | — |
| Life time limited by occurrence of peeling, h | >500 | >500 | 480 | 460 | >500 | >500 |

| Components of grease composition | Example | | Comparative Example | | |
|---|---|---|---|---|---|
| and mixing ratios (part by weight) | 1-7 | 1-8 | 1-1 | 1-2 | 1-3 |
| Base grease | | | | | |
| Base oil | | | | | |
| Synthetic hydrocarbon oil[1)] | 15 | 15 | 15 | 15 | 15 |
| Alkyldiphenyl ether oil[2)] | 63 | 63 | 63 | 63 | 63 |
| Thickener | | | | | |
| Amine: Octylamine | — | — | — | — | — |
| Amine: p-toluidine | 10.1 | 10.1 | 10.1 | 10.1 | 10.1 |
| Diisocyanate: MDI[3)] | 11.9 | 11.9 | 11.9 | 11.9 | 11.9 |
| (Total of parts by weight of components) | (100) | (100) | (100) | (100) | (100) |
| Additive | | | | | |
| Antioxidant[4)] | 1 | 1 | 1 | 1 | 1 |
| Aluminum powder[5)] | — | — | — | 0.02 | 15 |
| Aluminum carbonate[6)] | 1 | — | — | — | — |
| Aluminum nitrate[7)] | — | 1 | — | — | — |
| Life time limited by occurrence of peeling, h | 420 | 400 | 200 | 220 | 180 |

[1)]Produced by Nippon Steel Chemical Co., Ltd., Shin-fluid601, kinematic viscosity at 40° C.: 30 mm$^2$/sec
[2)]Produced by Matsumura Oil Research Corp., MorescoHilubeLB100, kinematic viscosity at 40° C.: 97 mm$^2$/sec
[3)]Produced by Nippon Polyurethane Industry Co., Ltd., MillionateMT
[4)]Hindered phenol
[5)]Produced by Wako Pure Chemical Industries, Ltd., average particle diameter: about 45 μm
[6),7)]Reagent produced by Wako Pure Chemical Industries, Ltd.

TABLE 2

| Components of grease composition | Example | | | | | |
|---|---|---|---|---|---|---|
| and mixing ratios (part by weight) | 2-1 | 2-2 | 2-3 | 2-4 | 2-5 | 2-6 |
| Base grease | | | | | | |
| Base oil | | | | | | |
| Synthetic hydrocarbon oil[1)] | — | 15 | 63 | 15 | 15 | 15 |
| Alkyldiphenyl ether oil[2)] | 80 | 63 | 15 | 63 | 63 | 63 |
| Thickener | | | | | | |
| Amine: Octylamine | — | — | — | 5.8 | — | — |
| Amine: p-toluidine | 9.2 | 10.1 | 10.1 | 4.9 | 10.1 | 10.1 |
| Diisocyanate: MDI[3)] | 10.8 | 11.9 | 11.9 | 11.3 | 11.9 | 11.9 |
| (Total of parts by weight of components) | (100) | (100) | (100) | (100) | (100) | (100) |

TABLE 2-continued

| Additive | | | | | | |
|---|---|---|---|---|---|---|
| Antioxidant[4] | 1 | 1 | 1 | 1 | 1 | 1 |
| Aluminum powder[5] | 1 | 1 | 1 | 1 | 0.1 | 5 |
| Aluminum carbonate[6] | — | — | — | — | — | — |
| Aluminum nitrate[7] | — | — | — | — | — | — |
| Life time limited by occurrence of peeling, h | >500 | >500 | 480 | 460 | >500 | >500 |

| Components of grease composition | Example | | Comparative Example | | |
|---|---|---|---|---|---|
| and mixing ratios (part by weight) | 2-7 | 2-8 | 2-1 | 2-2 | 2-3 |
| Base grease | | | | | |
| Base oil | | | | | |
| Synthetic hydrocarbon oil[1] | 15 | 15 | 15 | 15 | 15 |
| Alkyldiphenyl ether oil[2] | 63 | 63 | 63 | 63 | 63 |
| Thickener | | | | | |
| Amine: Octylamine | — | — | — | — | — |
| Amine: p-toluidine | 10.1 | 10.1 | 10.1 | 10.1 | 10.1 |
| Diisocyanate: MDI[3] | 11.9 | 11.9 | 11.9 | 11.9 | 11.9 |
| (Total of parts by weight of components) | (100) | (100) | (100) | (100) | (100) |
| Additive | | | | | |
| Antioxidant[4] | 1 | 1 | 1 | 1 | 1 |
| Aluminum powder[5] | — | — | — | 0.02 | 15 |
| Aluminum carbonate[6] | 1 | — | — | — | — |
| Aluminum nitrate[7] | — | 1 | — | — | — |
| Life time limited by occurrence of peeling, h | 420 | 400 | 200 | 220 | 180 |

[1]Produced by Nippon Steel Chemical Co., Ltd., Shin-fluid601, kinematic viscosity at 40° C.: 30 mm²/sec
[2]Produced by Matsumura Oil Research Corp., MorescoHilubeLB100, kinematic viscosity at 40° C.: 97 mm²/sec
[3]Produced by Nippon Polyurethane Industry Co., Ltd., MillionateMT
[4]Alkylated diphenylamine
[5]Produced by Koujundo Chemical Laboratory Co., Ltd., by atomizing method, average particle diameter: about 20 μm
[6],[7]Reagent produced by Wako Pure Chemical Industries, Ltd.

As shown in tables 1 and 2, in the sudden acceleration/deceleration test 1 of each example, excellent results of not less than 400 hours (lifetime limited by occurrence of peeling) were shown. It is conceivable that because the aluminum-based additives were added to the base greases at predetermined ratios respectively, the peculiar peeling could be effectively prevented from occurring with the rolling surface turning into white in its texture.

Examples 3-1 Through 3-5

4,4'-diphenylmethane diisocyanate (MillionateMT (commercial name) produced by Nippon Polyurethane Industry Co., Ltd., hereinafter referred to as MDI) was dissolved in one half of a base oil shown in table 3 at a ratio shown in table 3. Monoamine was dissolved in the remaining half of the base oil at an equivalent weight two times larger than that of the MDI. The mixing ratio and kind of each of the MDI and the monoamine are as shown in table 3.

The solution in which the monoamine was dissolved was added to the solution in which the MDI was dissolved while the solution in which the MDI was dissolved was being stirred. The stirring continued for 30 minutes at 100 to 120° C. for reaction to form a diurea-based compound in the base oil.

Additives were added to the base oil at mixing ratios shown in table 3. The base oil was stirred at 100 to 120° C. for 10 minutes. Thereafter the base oil was cooled and homogenized by a three-roll mill to obtain a grease composition of each example.

In table 3, as synthetic hydrocarbon oil, ester oil, and mineral oil all used as the base oil, Shin-fluid 801, produced by Nippon Steel Chemical Co., Ltd., which has a kinematic viscosity of 47 mm²/second at 40° C., kaolube268 produced by Kao Corporation and Ketjenlube 115 produced by Akzo Nobel, and paraffin oil were used respectively. As the antioxidant, alkylated diphenylamine was used.

A sudden acceleration/deceleration test 2 and a high-temperature and high-speed test 1 were conducted on the obtained grease compositions. The test method and the test condition are shown below. The results are shown in table 3.
<Sudden Acceleration/Deceleration Test 2>

1.8 g of the grease composition of each example was enclosed in a rolling bearing (6303). To apply a load to each rolling bearing, each rolling bearing (specimen bearing) was incorporated in an alternator which is an example of an electric auxiliary machine. Each rolling bearing supported a rotating shaft by an inner ring. The rotating shaft supported a pulley around which a rotating belt was wound. The sudden acceleration/deceleration test was conducted on the bearings. The condition of the sudden acceleration/deceleration test was that as the drive condition, a load of 1960 N was applied to the specimen bearing mounted on the tip of the rotational shaft, and the rotational speed was set to 0 to 18000 rpm. The test was conducted in a state in which electric current of 0.1 A flowed through the specimen bearings. The time (lifetime hr limited by occurrence of peeling) when the generator stopped because peculiar peeling occurred inside the specimen bearing and the vibration of the vibration detector exceeded a predetermined value was measured. The test was conducted for not more than 300 hours.

Rolling bearings which had not less than 300 hours in the lifetime limited by the occurrence of peeling were evaluated as being excellent in preventing the occurrence of the peeling.

<High-Temperature and High-Speed Test 1>

1.8 g of the grease composition of each example was enclosed in a rolling bearing (6204). Each rolling bearing was rotated at 10000 rpm by setting the temperature of an outside-diameter portion of an outer ring thereof to 180° C. and applying radial and axial loads of 67 N thereto. A period of time till each rolling bearing was seized was measured.

Examples 3-6, 3-7 and Comparative Examples 3-4, 3-5

Li-12-hydroxy stearate was supplied to the base oil shown in table 3. While the base oil was being stirred, the base oil was heated at 200° C. to dissolve the Li-12-hydroxystearate therein. The mixing ratio of the Li-12-hydroxy stearate in each of the examples is as shown in table 3. After the base oil was cooled, additives were added to the base oil at mixing ratios shown in table 3. Thereafter the base oil was homogenized by the three-roll mill to obtain a grease composition of each example. Similarly to the example 3-1, the high-temperature and high-speed test 1 and the sudden acceleration/deceleration test 2 were conducted on the obtained grease compositions. In consideration of the heat resistance of lithium soap grease, the high-temperature and high-speed test was conducted at 150° C. Table 3 shows the results.

Comparative Examples 3-1 Through 3-3

In a method similar to the method of the example 3-1, base grease was prepared by selecting a thickener and a base oil at mixing ratios shown in table 3 and in addition, adding an additive to the base grease to obtain a grease composition of each comparative example. A test was conducted on each of the obtained grease compositions in a manner similar to that of the example 3-1 to evaluate the grease compositions. Results are shown in table 3.

TABLE 3

| Components of grease composition and mixing ratios (part by weight) | Example | | | | | | |
|---|---|---|---|---|---|---|---|
| | 3-1 | 3-2 | 3-3 | 3-4 | 3-5 | 3-6 | 3-7 |
| Base grease | | | | | | | |
| Base oil | | | | | | | |
| Synthetic hydrocarbon oil[1)] | — | 62 | 60 | 62 | 62 | — | — |
| Polyol ester oil[2)] | 85 | — | — | 25 | 25 | 90 | — |
| Polymer ester oil[3)] | — | 25 | 25 | — | — | — | — |
| Mineral oil[4)] | — | — | — | — | — | — | 90 |
| Thickener | | | | | | | |
| Amine: cyclohexylamine | 6.6 | — | 6.6 | — | — | — | — |
| Amine: Octylamine | — | 6.6 | — | 6.6 | 6.6 | — | — |
| Diisocyanate MDI[5)] | 8.4 | 6.4 | 8.4 | 6.4 | 6.4 | — | — |
| Li-hydroxy stearate | — | — | — | — | — | 10 | 10 |
| (Total of parts by weight of components) | (100) | (100) | (100) | (100) | (100) | (100) | (100) |
| Additive | | | | | | | |
| Antioxidant[6)] | 2 | 2 | 2 | 2 | 2 | 2 | 2 |
| Aluminum powder[7)] | 1 | 0.1 | 5 | — | — | 1 | 1 |
| Aluminum carbonate[8)] | — | — | — | 1 | — | — | — |
| Aluminum nitrate[9)] | — | — | — | — | 1 | — | — |
| High-temperature and high-speed test (180° C., hr) | 440 | 420 | 460 | 390 | 360 | — | — |
| High-temperature and high-speed test (150° C., hr) | — | — | — | — | — | 700 | 280 |
| Lifetime limited by occurrence of peeling, hr | >300 | >300 | >300 | >300 | >300 | >300 | >300 |

| Components of grease composition and mixing ratios (part by weight) | Comparative Example | | | | |
|---|---|---|---|---|---|
| | 3-1 | 3-2 | 3-3 | 3-4 | 3-5 |
| Base grease | | | | | |
| Base oil | | | | | |
| Synthetic hydrocarbon oil[1)] | 62 | 62 | 62 | — | — |
| Polyol ester oil[2)] | — | — | — | 90 | — |
| Polymer ester oil[3)] | 25 | 25 | 25 | — | — |
| Mineral oil[4)] | — | — | — | — | 90 |
| Thickener | | | | | |
| Amine: cyclohexylamine | — | — | — | — | — |
| Amine: Octylamine | 6.6 | 6.6 | 6.6 | — | — |
| Diisocyanate MDI[5)] | 6.4 | 6.4 | 6.4 | — | — |
| Li-hydroxy stearate | — | — | — | 10 | 10 |
| (Total of parts by weight of components) | (100) | (100) | (100) | (100) | (100) |
| Additive | | | | | |
| Antioxidant[6)] | — | 2 | 2 | 2 | 2 |
| Aluminum powder[7)] | — | 0.02 | 15 | — | — |

TABLE 3-continued

| Aluminum carbonate[8] | — | — | — | — | — |
| Aluminum nitrate[9] | — | — | — | — | — |
| High-temperature and high-speed test (180° C., hr) | 130 | 370 | 240 | — | — |
| High-temperature and high-speed test (150° C., hr) | — | — | — | 700 | 90 |
| Lifetime limited by occurrence of peeling, hr | 120 | 150 | 130 | 80 | 100 |

[1])Produced by Nippon Steel Chemical Co., Ltd., Shin-fluid801, kinematic viscosity at 40° C.: 47 mm$^2$/sec
[2])Produced by Kao Corporation, kaolube 268, kinematic viscosity at 40° C.: 33 mm$^2$/sec
[3])Produced by Akzo Nobel, Ketjenlube 115, kinematic viscosity at 40° C.: 112 mm$^2$/sec
[4])Paraffin mineral oil, kinematic viscosity at 40° C.: 30.7 mm$^2$/sec
[5])Produced by Nippon Polyurethane Industry Co., Ltd., MillionateMT
[6])alkyldiphenylamine
[7])Produced by Wako Pure Chemical Industries, Ltd., average particle diameter: about 45 μm
[8,9])Reagent produced by Wako Pure Chemical Industries, Ltd.

As shown in table 3, in the sudden acceleration/deceleration test 2 of each example, excellent results of not less than 300 hours (lifetime limited by occurrence of peeling) were shown. It is conceivable that because the aluminum-based additives were added to the base greases at predetermined ratios respectively, the peculiar peeling could be effectively prevented from occurring with the rolling surface of the bearing turning into white in its texture.

Examples 4-1 Through 4-8

4,4'-diphenylmethane diisocyanate (MillionateMT produced by Nippon Polyurethane Industry Co., Ltd., hereinafter referred to as MDI) was dissolved in one half of a base oil shown in table 4 at ratios shown in table 4. Monoamine was dissolved in the remaining half of the base oil at an equivalent weight two times larger than that of the MDI. The mixing ratio and kind of each of the MDI and the monoamine are as shown in table 4.

The solution in which the monoamine was dissolved was added to the solution in which the MDI was dissolved, while the solution in which the MDI was dissolved was being stirred. The stirring continued for 30 minutes at 100 to 120° C. for reaction to form a diurea-based compound in the base oil.

An aluminum-based additive and an antioxidant were added to the base oil at mixing ratios shown in table 4. The base oil was stirred at 100 to 120° C. for 10 minutes. Thereafter the base oil was cooled and homogenized by a three-roll mill to obtain a grease composition of each example.

In table 4, as synthetic hydrocarbon oil, alkyldiphenyl ether oil, and polyol ester oil all used as the base oil, Shin-fluid 801, produced by Nippon Steel Chemical Co., Ltd., which has a kinematic viscosity of 47 mm$^2$/second at 40° C., MorescoHi-lubeLB100, produced by Matsumura Oil Research Corp., which has a kinematic viscosity of 97 mm$^2$/second at 40° C., and kaolube268, produced by Kao Corporation, which has a kinematic viscosity of 33 mm$^2$/second at 40° C. were used respectively. As the mineral oil, paraffin oil having a kinematic viscosity of 30.7 mm$^2$/second (40° C.) was used.

As the antioxidant, alkylated diphenylamine was used.

The worked penetration of each of the obtained grease compositions was measured by the method specified in JIS K2220. The high-temperature and high-speed test 1 and the sudden acceleration/deceleration test 2 were conducted on them. The test was conducted for not more than 500 hours. The results are shown in table 4.

Examples 4-9, 4-10 and Comparative Example 4-5

Li-12-hydroxy stearate was supplied to the base oil shown in table 4. While the base oil was being stirred, the base oil was heated at 200° C. to dissolve the Li-12-hydroxystearate therein. The mixing ratio of each component is as shown in table 4. After the base oil was cooled, the aluminum-based additive and the antioxidant were added to the base oil at mixing ratios shown in table 4. Thereafter the base oil was homogenized by the three-roll mill to obtain a grease composition of each example and comparison example. Similarly to the example 4-1, the high-temperature and high-speed test 1 and the sudden acceleration/deceleration test 2 were conducted on the obtained grease compositions. In consideration of the heat resistance of lithium soap grease, the high-temperature and high-speed test was conducted at 150° C. Table 4 shows the results.

Comparative Examples 4-1 Through 4-4

In a method similar to the method of the example 4-1, base grease was prepared by selecting a thickener and a base oil at mixing ratios shown in table 4 and in addition, adding an additive to the base grease to obtain a grease composition of each comparative example. A test was conducted on each grease composition in a manner similar to that of the example 4-1 to evaluate the grease compositions. Results are shown in table 4.

TABLE 4

| Components of grease composition and mixing ratios (part by weight) | Example | | | | | | | |
|---|---|---|---|---|---|---|---|---|
| | 4-1 | 4-2 | 4-3 | 4-4 | 4-5 | 4-6 | 4-7 | 4-8 |
| Base grease | | | | | | | | |
| Base oil | | | | | | | | |
| Alkyldiphenyl ether oil | 80 | 80 | 80 | 60 | 60 | — | 80 | 80 |
| Synthetic hydrocarbon oil | — | — | — | 20 | — | — | — | — |
| Polyol ester oil | — | — | — | — | 20 | — | — | — |
| Mineral oil | — | — | — | — | — | 87 | — | — |

TABLE 4-continued

| Thickener | | | | | | | | |
|---|---|---|---|---|---|---|---|---|
| Amine: p-toluidine | 9.3 | 9.3 | 9.3 | 9.3 | 9.3 | — | 9.3 | 9.3 |
| Amine: cyclohexylamine | — | — | — | — | — | — | — | — |
| Amine: Octylamine | — | — | — | — | — | 6.6 | — | — |
| Diisocyanate MDI | 10.7 | 10.7 | 10.7 | 10.7 | 10.7 | 6.4 | 10.7 | 10.7 |
| Li-12-hydroxy stearate | — | — | — | — | — | — | — | — |
| (Total of parts by weight of components) | (100) | (100) | (100) | (100) | (100) | (100) | (100) | (100) |
| Additive | | | | | | | | |
| Antioxidant | 2 | 2 | 2 | 2 | 2 | 2 | 2 | 2 |
| Aluminum powder | 1 | — | — | 1 | 1 | 1 | 0.1 | 5 |
| Aluminum carbonate | — | 1 | — | — | — | — | — | — |
| Aluminum nitrate | — | — | 1 | — | — | — | — | — |
| Worked penetration | 280 | 290 | 295 | 285 | 285 | 275 | 280 | 285 |
| High-temperature and high-speed test (180° C., h) | 620 | 590 | 660 | 650 | 540 | 210 | 680 | 680 |
| High-temperature and high-speed test (150° C., h) | — | — | — | — | — | — | — | — |
| Lifetime limited by occurrence of peeling, h | >500 | 440 | 400 | >500 | >500 | 380 | >500 | >500 |

| Components of grease composition | Example | | Comparative Example | | | | |
|---|---|---|---|---|---|---|---|
| and mixing ratios (part by weight) | 4-9 | 4-10 | 4-1 | 4-2 | 4-3 | 4-4 | 4-5 |
| Base grease | | | | | | | |
| Base oil | | | | | | | |
| Alkyldiphenyl ether oil | — | — | 60 | — | — | — | — |
| synthetic hydrocarbon oil | — | — | 20 | — | 87 | — | — |
| Polyol ester oil | 90 | — | — | 85 | — | — | — |
| Mineral oil | — | 90 | — | — | — | 87 | 90 |
| Thickener | | | | | | | |
| Amine: p-toluidine | — | — | 9.3 | — | — | — | — |
| Amine: cyclohexylamine | — | — | — | 6.6 | — | — | — |
| Amine: Octylamine | — | — | — | — | 6.6 | 6.6 | — |
| Diisocyanate MDI | — | — | 10.7 | 8.4 | 6.4 | 6.4 | — |
| Li-12-hydroxy stearate | 10 | 10 | — | — | — | — | 10 |
| (Total of parts by weight of components) | (100) | (100) | (100) | (100) | (100) | (100) | (100) |
| Additive | | | | | | | |
| Antioxidant | 2 | 2 | 2 | 2 | 2 | 2 | 2 |
| Aluminum powder | 1 | 1 | — | 0.02 | 20 | — | — |
| Aluminum carbonate | — | — | — | — | — | — | — |
| Aluminum nitrate | — | — | — | — | — | — | — |
| Worked penetration | 290 | 285 | 290 | 285 | 290 | 290 | 285 |
| High-temperature and high-speed test (180° C., h) | — | — | 420 | 270 | 480 | 200 | — |
| High-temperature and high-speed test (150° C., h) | 700 | 280 | — | — | — | — | 90 |
| Lifetime limited by occurrence of peeling, h | >500 | >500 | 260 | 190 | 210 | 150 | 100 |

[1] Produced by Matsumura Oil Research Corp., MorescoHilubeLB100, kinematic viscosity at 40° C.: 97 mm$^2$/sec
[2] Produced by Nippon Steel Chemical Co., Ltd., Shin-fluid801, kinematic viscosity at 40° C.: 47 mm$^2$/sec
[3] Produced by Kao corporation, kaolube 268, kinematic viscosity at 40° C.: 33 mm$^2$/sec
[4] Paraffin mineral oil, kinematic viscosity at 40° C.: 30.7 mm$^2$/sec
[5] Produced by Nippon Polyurethane Industry Co., Ltd., MillionateMT
[6] alkylated diphenylamine
[7] Produced by Koujundo Chemical Laboratory Co., Ltd., by atomizing method, average particle diameter: about 20 μm
[8],[9] Wako Pure Chemical Industries, Ltd.

As shown in tables 4, in each example, the peculiar peeling could be effectively prevented from occurring with the rolling surface of the bearing turning into white in its texture, excellent results were shown in the high-temperature and high-speed test and the sudden acceleration/deceleration test. In the sudden acceleration/deceleration test, results of not less than 380 hours were shown in each example.

Examples 5-1 Through 5-7

In a reaction container, after a thickener was added to a base oil, uniformalizing treatment was carried out by using a three-roll mill to obtain urea/PAO oil-based grease (kinematic viscosity of base oil at 40° C.: 46 mm$^2$/second) shown in table 5. An aluminum-based additive and an amine-based antioxidant (Noclack AD-F produced by Ouchi Shinko Chemical Industrial Co., Ltd.) were added to the obtained base grease as additives at ratios shown in table 5 to prepare the grease of each example. An extreme-pressure property evaluation test and the high-temperature and high-speed test 2 were conducted on each obtained grease. Results are shown in table 5.

<Extreme-Pressure Property Evaluation Test>

An apparatus for evaluating the extreme-pressure property is shown in FIG. 10. The evaluation test apparatus is constructed of a ring-shaped specimen 314 of φ40 mm×10 mm fixed to a rotational shaft 313 and a ring-shaped specimen 315 whose end surface is rubbed with an end surface 316 of the specimen 314. The grease for the roller bearing was applied to the end surface 316, and the rotational shaft 313 was rotated at 2000 rpm. An axial load of 490 N in the right-hand direction A in FIG. 10 and a radial load of 392 N were applied to evaluate the extreme-pressure property thereof. The extreme-pressure property was evaluated by measuring vibrations of the rotational shaft 313 generated owing to an increase of the frictional wear of sliding portions of both specimens by a vibration sensor. The test was conducted until the vibration value of the rotational shaft became twice as large as an initial value thereof. The period of time it took for the vibration value thereof to become twice as large as the initial value thereof was measured.

The longer is the period of time it took for the vibration value thereof to become twice as large as the initial value thereof, the larger is the extreme-pressure property effect, and hence excellent heat resistance and durability are shown. The heat resistance and durability of the greases of the examples and the comparative examples were evaluated by comparing the above-described measured time periods with one another.

<High-Temperature and High-Speed Test 2>

1.8 g of the grease of each example and comparative example was enclosed in each rolling bearing (dimension of bearing: inner diameter of φ20 mm×outer diameter of φ47 mm×width of 14 mm). Each rolling bearing was rotated at 10000 rpm by setting the temperature of the outside-diameter portion of the outer ring thereof to 150° C. and applying radial and axial loads of 67 N thereto. A period of time till each rolling bearing was seized was measured.

Comparative Example 5-1 Through 5-3

Except that the aluminum-based additive was not used as the additive, the extreme-pressure property evaluation test and the high-temperature and high-speed test 2 were conducted on grease obtained by processing components in a manner similar to the example 5-1. Result are shown in table 5.

TABLE 5

| Components of grease composition and mixing ratios (part by weight) | Example 5-1 | Example 5-2 | Example 5-3 | Example 5-4 | Example 5-5 | Example 5-6 | Example 5-7 | Comparative Example 5-1 | Comparative Example 5-2 | Comparative Example 5-3 |
|---|---|---|---|---|---|---|---|---|---|---|
| Base grease |  |  |  |  |  |  |  |  |  |  |
| Base oil |  |  |  |  |  |  |  |  |  |  |
| PAO oil[1] | 82 | 82 | 84 | 79 | 82 | 82 | 82 | 82 | 84 | 79 |
| Thickener |  |  |  |  |  |  |  |  |  |  |
| Octylamine | — | — | 8.1 | — | — |  |  |  |  |  |
| Cyclohexylamine | 8 | 8 | — | — | 8 |  |  |  |  |  |
| p-toluidine | — | — | — | 9.7 | — |  |  |  |  |  |
| MDI[2] | 10 | 10 | 7.9 | 11.3 | 10 |  |  |  |  |  |
| (Total of parts by weight of components) | 100 | 100 | 100 | 100 | 100 |  |  |  |  |  |
| Additive |  |  |  |  |  |  |  |  |  |  |
| Aluminum powder[3] | — | 5 | 5 | 5 | — |  |  |  |  |  |
| Aluminum sulfate[4] | 5 | — | — | — | — |  |  |  |  |  |
| Aluminum carbonate[5] | — | — | — | — | 5 |  |  |  |  |  |
| Amine-based antioxidant[6] | 2 | 2 | 2 | 2 | 2 |  |  |  |  |  |
| Extreme-pressure evaluation test (h) | 170 | 320 | 284 | 240 | 168 |  |  |  |  |  |
| High-temperature and high-speed test (h) | 3600 | 3820 | 4120 | 3560 | 2980 |  |  |  |  |  |

TABLE 5-continued

| Thickener | | | | | |
|---|---|---|---|---|---|
| Octylamine | — | — | — | 8.1 | — |
| Cyclohexylamine | 8 | 8 | 8 | — | — |
| p-toluidine | — | — | — | — | 9.7 |
| MDI[2] | 10 | 10 | 10 | 7.9 | 11.3 |
| (Total of parts by weight of components) | 100 | 100 | 100 | 100 | 100 |
| Additive | | | | | |
| Aluminum powder[3] | 1 | 10 | — | — | — |
| Aluminum sulfate[4] | — | — | — | — | — |
| Aluminum carbonate[5] | — | — | — | — | — |
| Amine-based antioxidant[6] | 2 | 2 | 2 | 2 | 2 |
| Extreme-pressure evaluation test (h) | 310 | 200 | 39 | 70 | 22 |
| High-temperature and high-speed test (h) | 3060 | 2700 | 2820 | 3100 | 2800 |

[1] Kinematic viscosity at 40° C.: 46 mm²/sec
[2] Diphenylmethane diisocyanate: produced by Nippon Polyurethane Industry Co., Ltd., MillionateMT
[3] Produced by Koujundo Chemical Laboratory Co., Ltd., by atomizing method, average particle diameter: about 20 μm
[4,5] Wako Pure Chemical Industries, Ltd.
[6] Produced by Ouchi Shinko Chemical Industrial Co., Ltd., Noclack AD-F Each of examples in which the aluminum-based additive was used, as shown in table 5, to be the grease for the one-way clutch of the present invention had a wear resistance and a long-term durability higher than the comparative examples in which the aluminum-based additive was not used.

INDUSTRIAL APPLICABILITY

The grease composition of the present invention is capable of effectively preventing hydrogen brittleness-caused peculiar peeling from occurring on the rolling surface with the rolling surface turning into white in its texture. Therefore the grease composition can be preferably utilized as a grease composition which is enclosed in rolling bearings for use in electric auxiliary machines of a car such as a fan-coupling apparatus, an alternator, an idler pulley, an electromagnetic clutch for an air conditioner, an electromotive fan motor, and the like; grease-enclosed bearings for motors for use in industrial machines and electric equipment; rolling bearings, for use in a fuel cell system, which are used for a compressed fluid-feeding machine or the like for delivering various kinds of fluids inside the fuel cell system under pressure; rolling bearings, for use in robots, which are used in operating portions of industrial robots; and a one-way clutch.

EXPLANATION OF REFERENCE SYMBOLS AND NUMERALS

Figure 1:
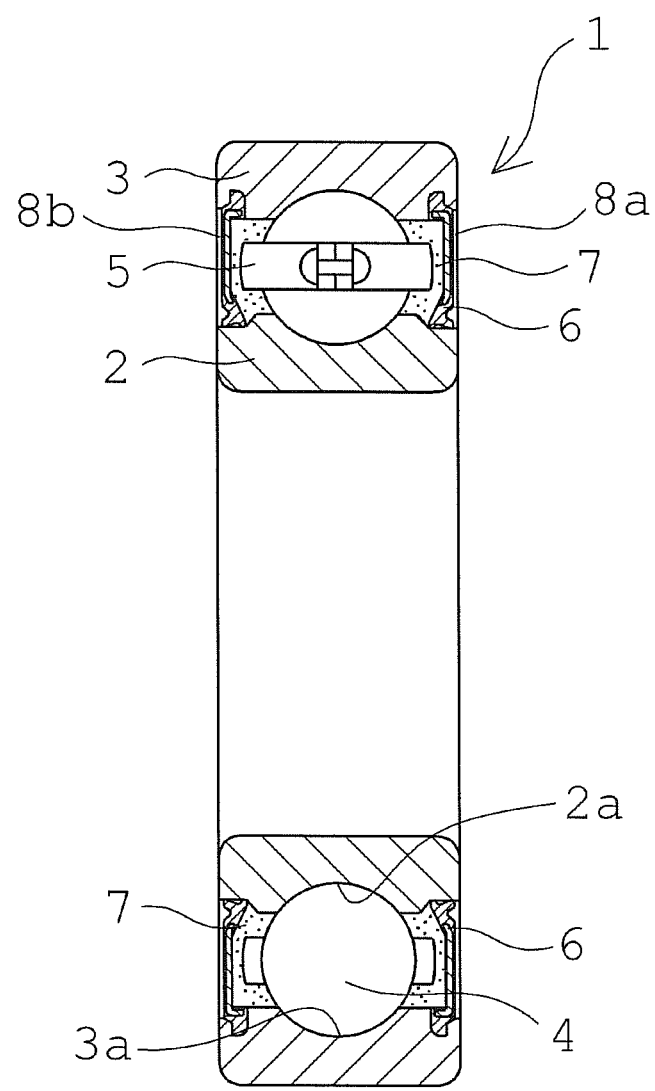
FIG. 1 is a sectional view of a grease-enclosed bearing (deep groove ball bearing).
Figure 2:
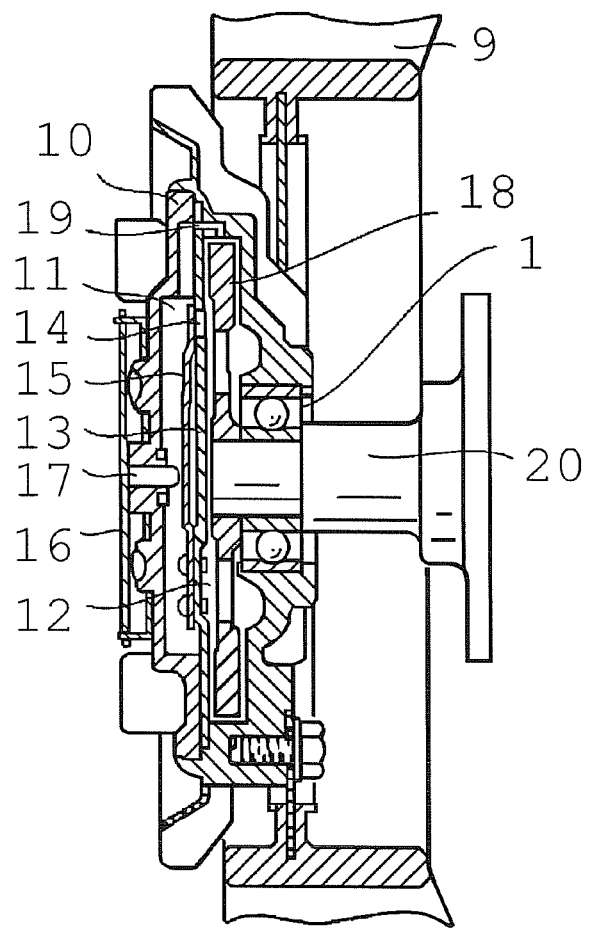
FIG. 2 is a sectional view of a fan coupling apparatus.
Figure 3:
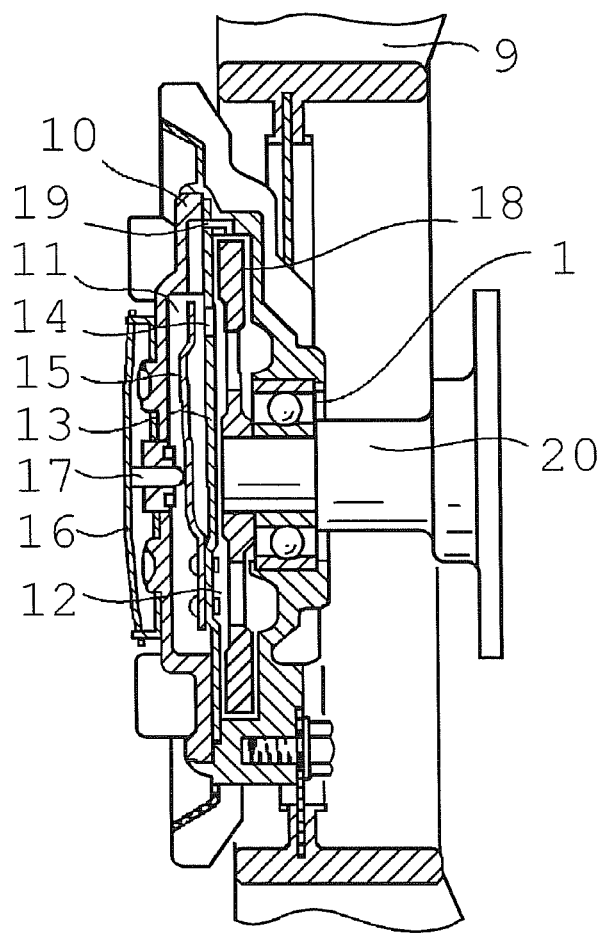
FIG. 3 is a sectional view of a fan coupling apparatus.
Figure 4:
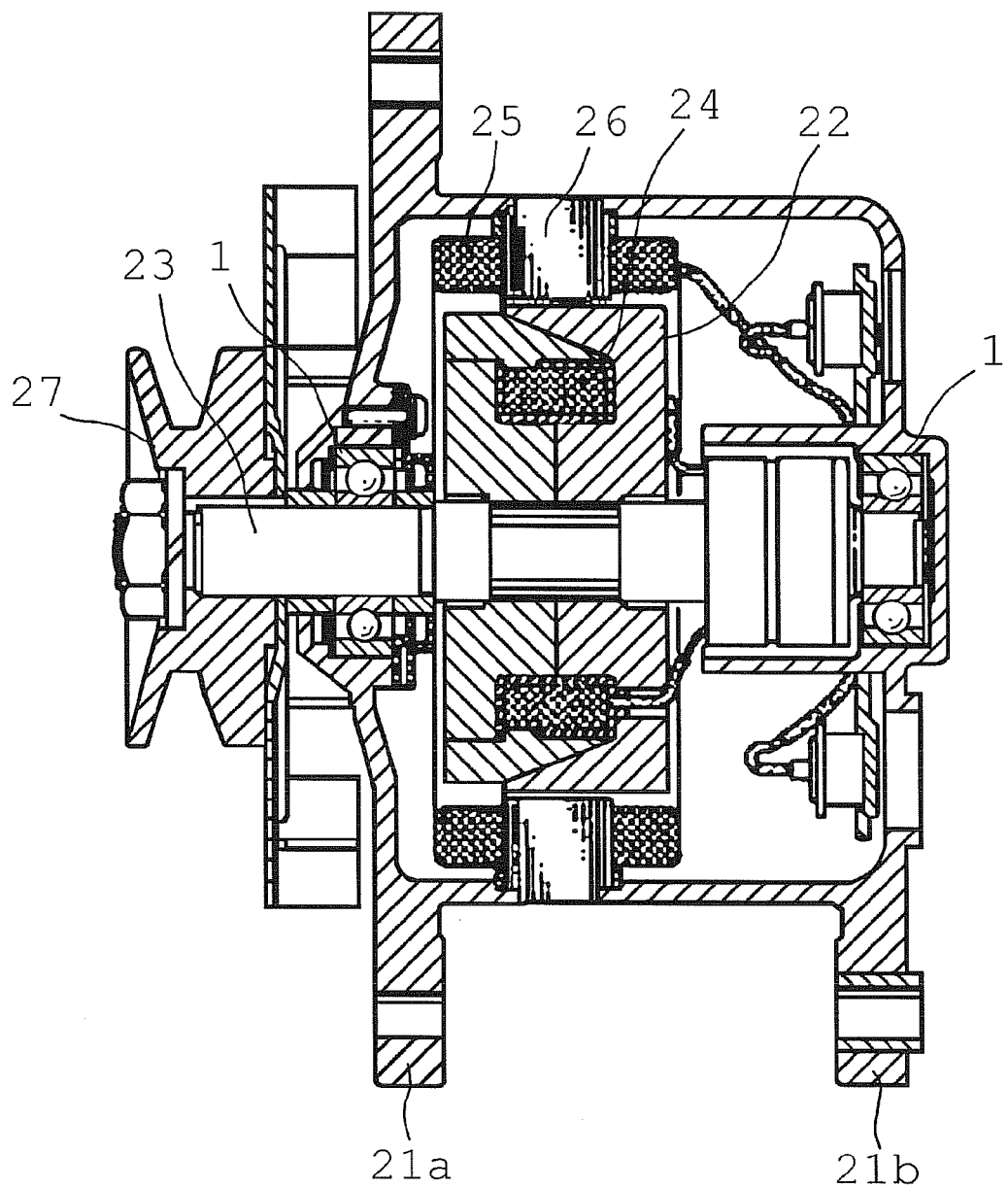
FIG. 4 is a sectional view of an alternator.
Figure 5:
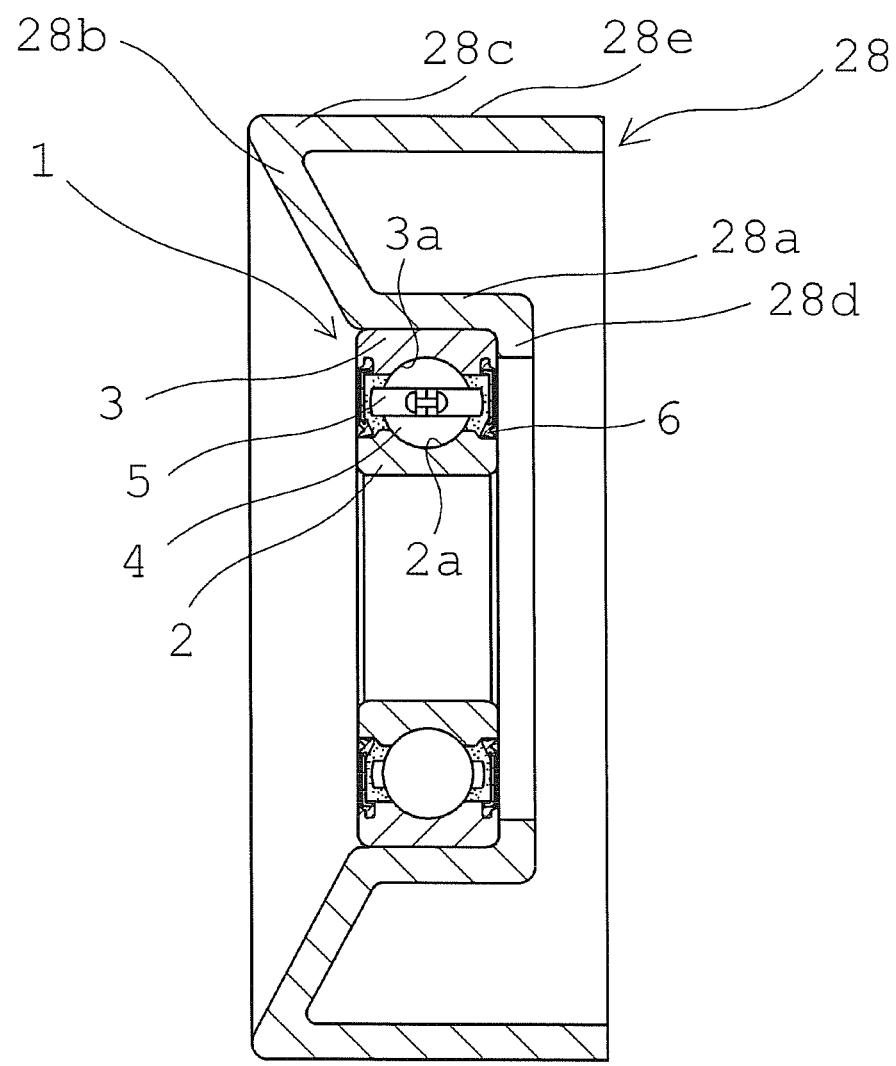
FIG. 5 is a sectional view of an idler pulley.
Figure 6:
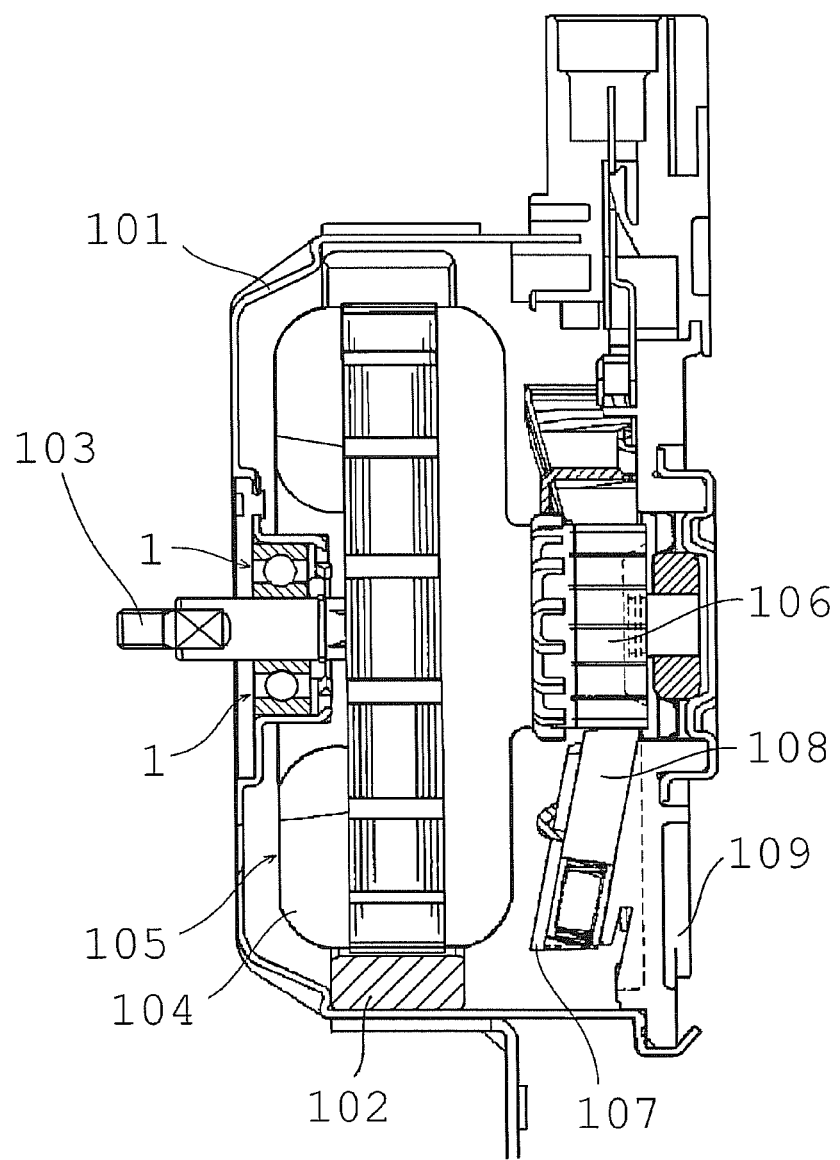
FIG. 6 is a sectional view of the construction of a motor.
Figure 7:
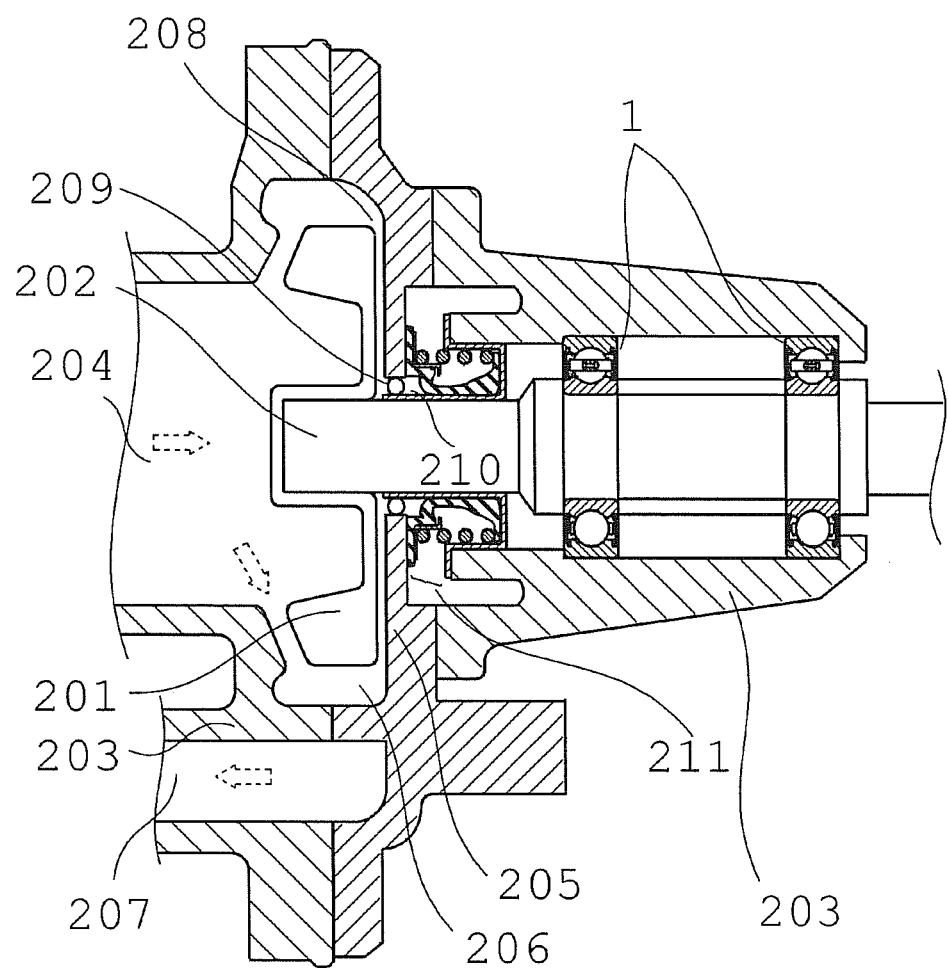
FIG. 7 is a sectional view of an impeller-type compressed fluid-feeding machine.
Figure 8:
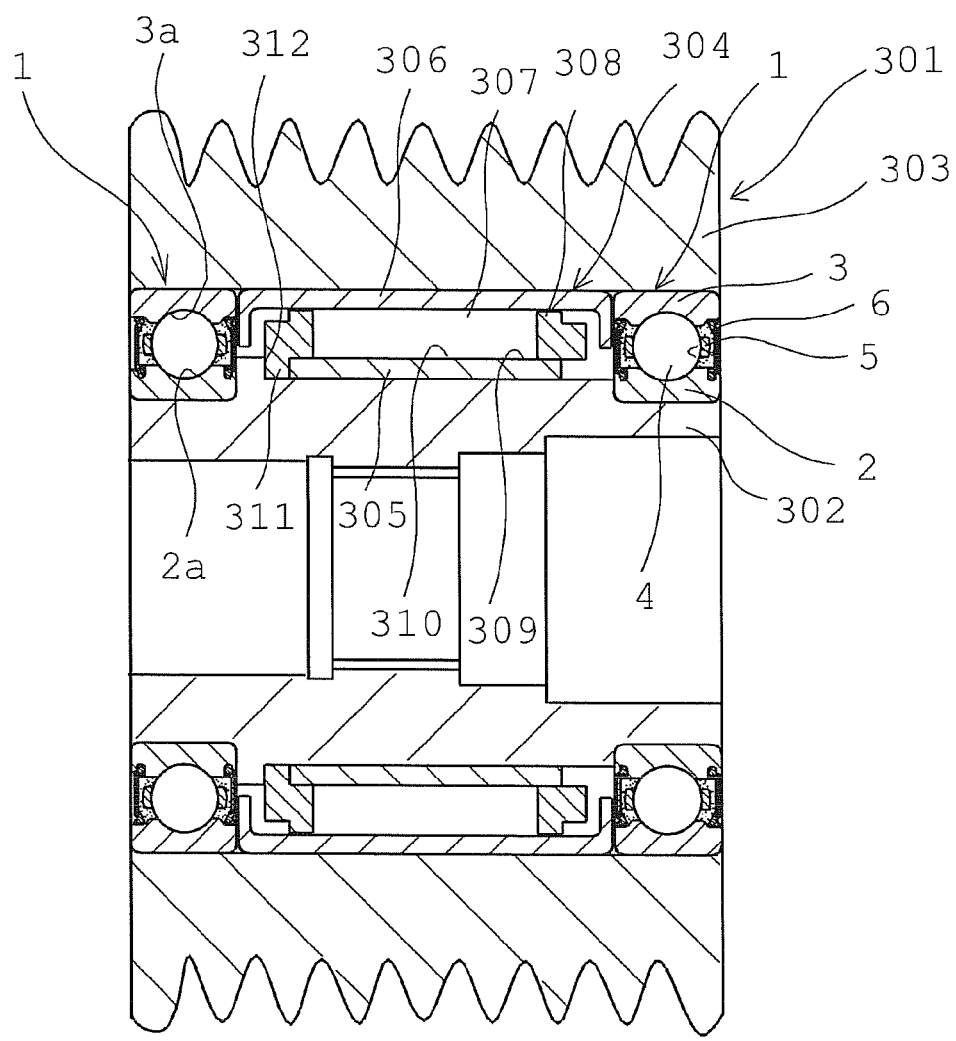
FIG. 8 is a sectional view of a one-way clutch.
Figure 9:
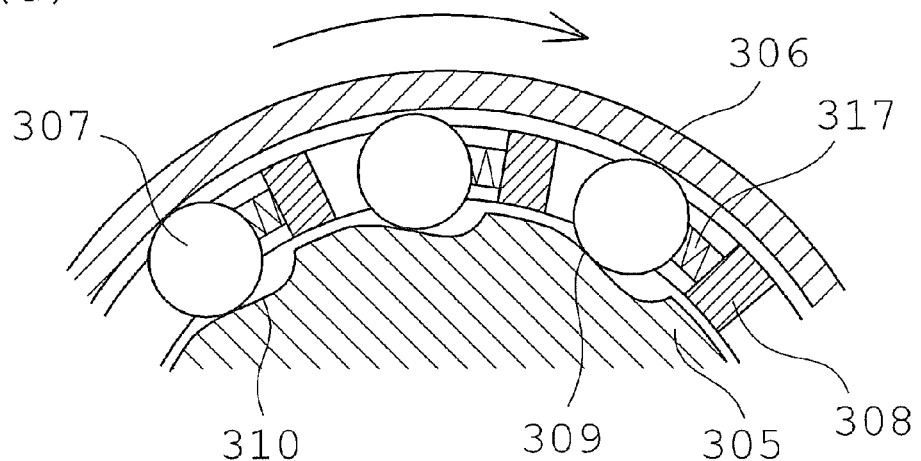
FIG. 9 is a sectional view of the one-way clutch in a circumferential direction thereof.
Figure 9:
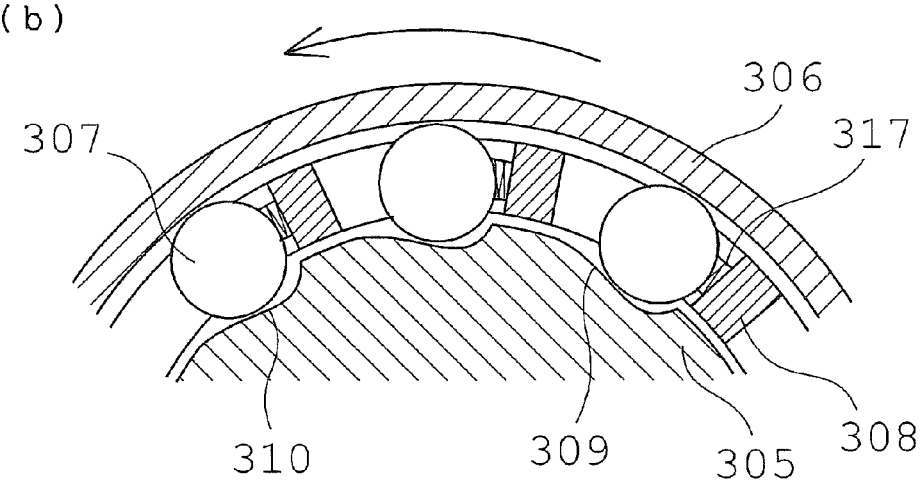
Figure 10:
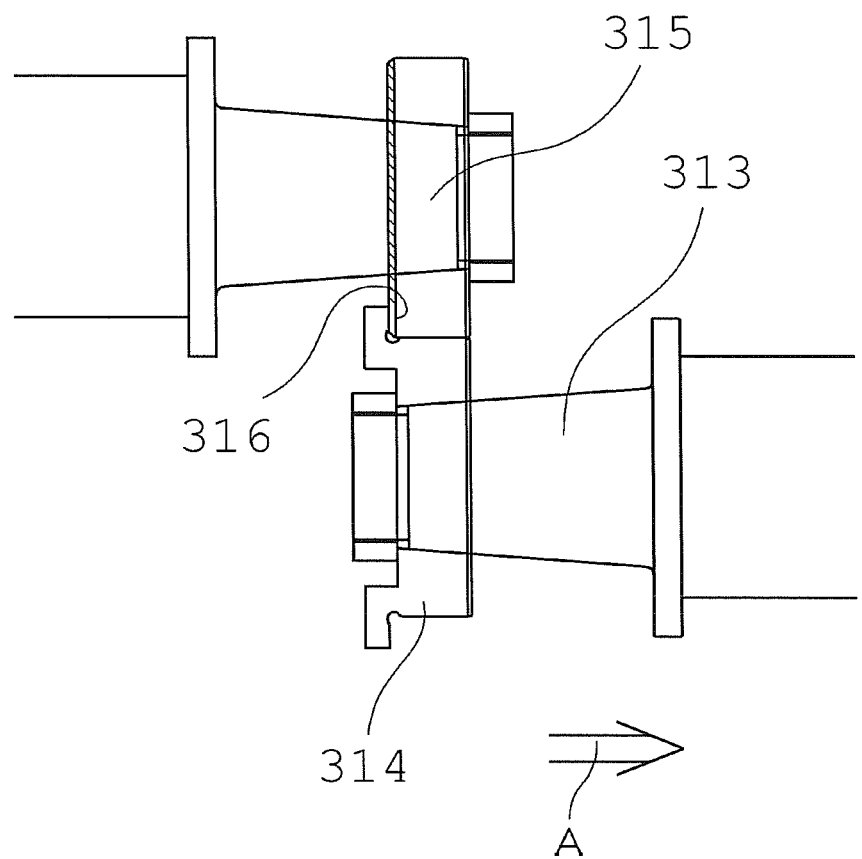
FIG. 10 shows an apparatus for evaluating an extreme-pressure property.

1: grease-enclosed bearing
2: inner ring
3: outer ring
4: rolling element
5: retainer
6: sealing member
7: grease composition
8a: opening
8b: opening
9: cooling fan
10: case
11: oil chamber
12: stirring chamber
13: partitioning plate
14: port
15: spring
16: bimetal
17: piston
18: drive disk
19: circulation hole
20: drive shaft
21a: frame
21b: frame
22: rotor
23: rotational shaft of rotor
24: rotor coil
25: stator
26: stator coil
27: pulley
28: pulley body
101: jacket
102: stator
103: rotational shaft
104: winding
105: rotor
106: commutator
107: brush holder
108: brush
109: end frame
201: impeller 202: rotational shaft
203: casing
204: gas-sucking port
205: back plate
206: pressure volute
207: gas-discharging port
208: rear space
209: seal ring
210: gap
211: mechanical seal
301: rotation-transmitting apparatus with built-in one-way clutch
302: sleeve
303: pulley
304: one-way clutch
305: inner ring for clutch
306: outer ring for clutch
307: roller
308: retainer for clutch
309: cam face
310: concavity
311: convexity
312: level-different surface
313: rotational shaft
314: ring-shaped specimen
315: ring-shaped specimen
316: end face
317: spring

The invention claimed is:

1. A grease composition for preventing a frictionally worn surface of a bearing portion containing an iron-based metal material or a newly generated surface consisting of the iron-based metal material exposed owing to wear from being peeled by hydrogen brittleness, said grease composition comprising a base grease which consists of a base oil and a thickener; and an additive added to said base grease, wherein said additive contains an antioxidant and aluminum sulfate, wherein the mixing ratio of said aluminum sulfate to 100 parts by weight of said base grease is set to 0.1 to 5 parts by weight, and wherein said thickener comprises a diurea-based compound represented by the formula (1)

(1)

$R_1$ and $R_3$ in the formula (1) indicate hydrocarbon radicals having carbon atoms of 6 to 20; $R_1$ and $R_3$ are identical to or different from each other; and $R_2$ indicates an aromatic hydrocarbon radical having carbon atoms of 6 to 15.

2. The grease composition according to claim 1, wherein said base oil is at least one oil selected from among alkyldiphenyl ether oil, poly-α-olefin oil, and ester oil.

3. The grease composition according to claim 2, wherein the kinematic viscosity of said base oil at 40° C. is 30 to 200 $mm^2/s$.

4. A bearing in which a grease composition is enclosed; and said grease composition is the grease composition according to claim 1.

5. The grease-enclosed bearing according to claim 4, wherein said grease-enclosed bearing is a rolling bearing, for use in an electric auxiliary machine of a car, which rotatably supports a rotational shaft driven by an engine output on a stationary member, wherein said rolling bearing comprises an inner ring and an outer ring; a plurality of rolling elements disposed between said inner ring and said outer ring; and sealing members, for sealing the grease composition on peripheries of said rolling elements, which are provided at openings disposed at both axial ends of said inner ring and said outer ring.

6. The grease-enclosed bearing according to claim 4, wherein said grease-enclosed bearing is a rolling bearing, for use in a fuel cell system, which rotatably supports a rotational portion of a compressed fluid-feeding machine for feeding a fluid used in said fuel cell system under pressure, wherein said rolling bearing comprises an inner ring and an outer ring; a plurality of rolling elements disposed between said inner ring and said outer ring; and sealing members, for sealing the grease composition on peripheries of said rolling elements, which are provided at openings disposed at both axial ends of said inner ring and said outer ring.

7. The grease-enclosed bearing according to claim 4, wherein said grease-enclosed bearing is a rolling bearing, for use in a motor, which supports a rotor of a motor, wherein said rolling bearing comprises an inner ring and an outer ring; a plurality of rolling elements disposed between said inner ring and said outer ring; and sealing members, for sealing the grease composition on peripheries of said rolling elements, which are provided at openings disposed at both axial ends of said inner ring and said outer ring.

8. The grease-enclosed bearing according to claim 4, wherein said grease-enclosed bearing is a rolling bearing, for use in a robot, which rotatably supports a rotational portion of an industrial robot, wherein said rolling bearing comprises an inner ring and an outer ring; a plurality of rolling elements disposed between said inner ring and said outer ring; and sealing members, for sealing the grease composition on peripheries of said rolling elements, which are provided at openings disposed at both axial ends of said inner ring and said outer ring.

9. A one-way clutch, to be mounted on an output member, comprising an outer ring for said clutch and a plurality of rollers provided on an inside-diameter surface of said outer ring, wherein only a one-direction torque of said outer ring for said clutch is transmitted to said output member via said rollers; and the grease composition according to claim 1 is enclosed in an internal space of said clutch in which a plurality of said rollers are mounted.

* * * * *